United States Patent [19]
Kaye et al.

[11] Patent Number: 5,600,450
[45] Date of Patent: Feb. 4, 1997

[54] FILM WEAVE CORRECTION SYSTEM

[75] Inventors: Michael C. Kaye, Agoura Hills; Majid Bemanian, Glendale, both of Calif.

[73] Assignee: MSCL, Inc., Santa Monica, Calif.

[21] Appl. No.: 519,648

[22] Filed: Aug. 25, 1995

Related U.S. Application Data

[63] Continuation of Ser. No. 259,125, Oct. 18, 1988, which is a continuation of Ser. No. 142,854, filed as PCT/US87/02234, Sep. 3, 1987, abandoned, which is a continuation-in-part of Ser. No. 904,035, Sep. 4, 1986, abandoned.

[51] Int. Cl.$^6$ .................................................. H04N 5/253
[52] U.S. Cl. ............................ 358/474; 358/488; 348/99
[58] Field of Search ...................... 348/96–112; 358/474, 358/487, 488, 496

[56] References Cited

U.S. PATENT DOCUMENTS

| | | | |
|---|---|---|---|
| 2,523,156 | 9/1950 | Somers | 348/102 |
| 2,818,467 | 12/1957 | Harris et al. | 348/105 |
| 2,851,521 | 9/1958 | Clapp | 358/345 |
| 2,890,277 | 6/1959 | Duke | 348/103 |
| 2,922,841 | 1/1960 | Graziano | 348/103 |
| 3,067,284 | 12/1962 | Baldwin | 348/103 |
| 3,221,337 | 11/1965 | Quinn et al. | 348/103 |
| 3,234,326 | 2/1966 | Goldmark et al. | 348/103 |
| 3,582,293 | 6/1971 | Crowder | 99/404 |
| 3,584,147 | 6/1971 | Flory | 348/97 |
| 3,584,148 | 6/1971 | Flory | 348/97 |
| 3,584,149 | 6/1971 | Flory | 348/105 |
| 3,604,850 | 9/1971 | Eckenbrecht | 348/101 |
| 3,609,228 | 9/1971 | Goldmark | 358/333 |
| 3,767,852 | 10/1973 | Horowitz et al. | 348/103 |
| 3,780,222 | 12/1973 | Pickstock et al. | 348/100 |
| 3,793,508 | 2/1974 | Maggi | 377/18 |
| 3,830,973 | 8/1974 | Peters | 348/103 |
| 3,856,987 | 12/1974 | McMann et al. | 348/103 |
| 3,875,582 | 4/1975 | Yagi et al. | 348/103 |
| 3,952,328 | 4/1976 | Biber | 348/104 |
| 3,968,404 | 7/1976 | Vidal | 348/103 |
| 3,976,832 | 8/1976 | Millward | 348/100 |
| 4,054,912 | 10/1977 | Millward et al. | 348/106 |
| 4,054,918 | 10/1977 | Kamogawa et al. | 348/100 |
| 4,104,680 | 8/1978 | Holland | 348/100 |

(List continued on next page.)

FOREIGN PATENT DOCUMENTS

| | | |
|---|---|---|
| 53242 | 3/1973 | Australia . |
| 965866 | 4/1975 | Canada . |
| 2150449 | 4/1973 | France . |
| 714345 | 8/1954 | United Kingdom . |
| 1131772 | 10/1968 | United Kingdom . |
| 1412128 | 10/1975 | United Kingdom . |
| 1413868 | 11/1975 | United Kingdom . |
| 1466273 | 3/1977 | United Kingdom . |

OTHER PUBLICATIONS

Continuous All–Electronic Scanner for 16MM Color Motion–Picture Film, Graziano, Journal of SMPTE vol. 62, p. 294, Apr., 1954.
3M Brochure "Introducing the 3M Brand Chromabeam System," Mar. 1970.
"Color EVR," IEEE Spectrum, Goldmark, Sep. 1970, p. 26.

*Primary Examiner*—Stephen Brinich
*Attorney, Agent, or Firm*—Pretty, Schroeder, Brueggemann & Clark

[57] ABSTRACT

A film correction system adjusts a relative position of film containing an area for information and a scanner of the film area. The system includes a scanner for scanning the film area at a film plane. A film drive moves the film along the film plane. A focused beam separate from the film area scanner scans a film edge in the film for determining a location of the film edge. A circuit is coupled to the focused beam scanner for changing a relative position of the film area scanner and the film area. The film edge scanner is a flying spot scanner, and the apparatus includes signal processors for processing the sprocket information. The system may be retrofit to an existing telecine apparatus. A separate coil may be used to provide deflection of a flying spot scanner used to scan the picture information on the film.

12 Claims, 19 Drawing Sheets

U.S. PATENT DOCUMENTS

| | | | |
|---|---|---|---|
| 4,296,438 | 10/1981 | Stemme et al. | 348/98 |
| 4,319,280 | 3/1982 | Roos et al. | 348/97 |
| 4,498,745 | 2/1985 | Dejeney | 352/119 |
| 4,823,204 | 4/1989 | Holland | 348/97 |
| 4,875,102 | 10/1989 | Poetsch | 348/97 |
| 4,875,103 | 10/1989 | Bridges et al. | 348/110 |
| 4,903,131 | 2/1990 | Lingemann et al. | 348/97 |
| 5,150,957 | 9/1992 | Walker | 348/103 |
| 5,159,441 | 10/1992 | Mead | 348/100 |
| 5,177,615 | 1/1993 | Ozaki et al. | 348/105 |
| 5,179,314 | 1/1993 | Walker | 348/106 |
| 5,430,478 | 7/1995 | Kaye et al. | 348/99 |

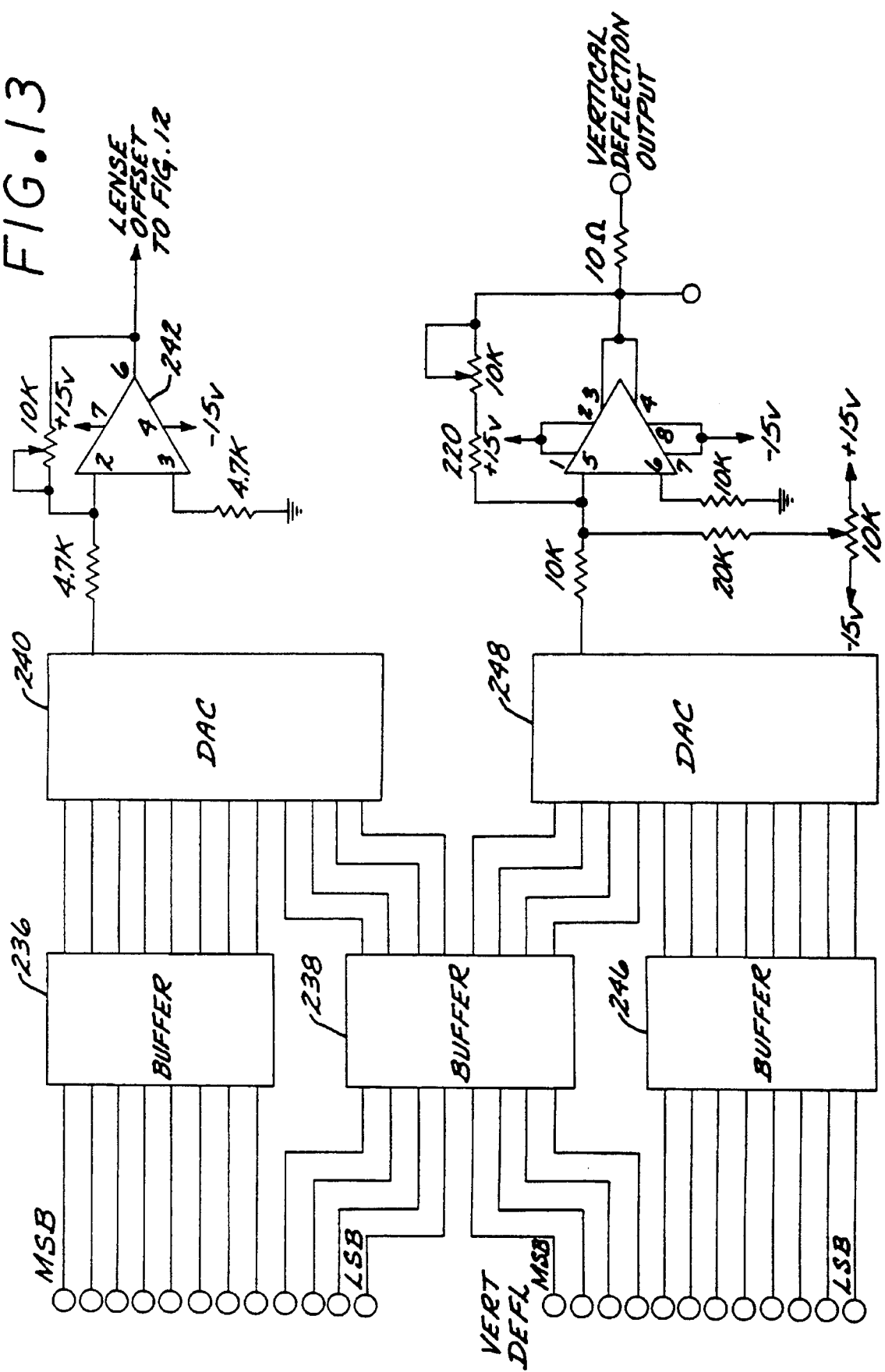

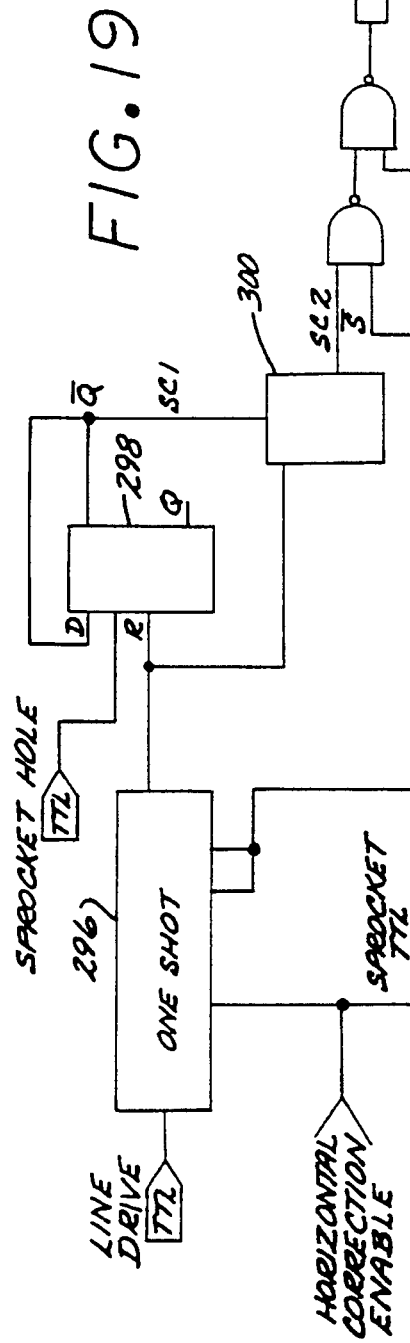
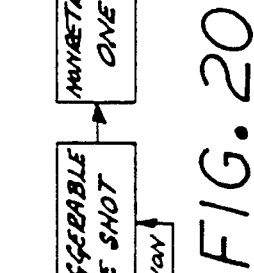
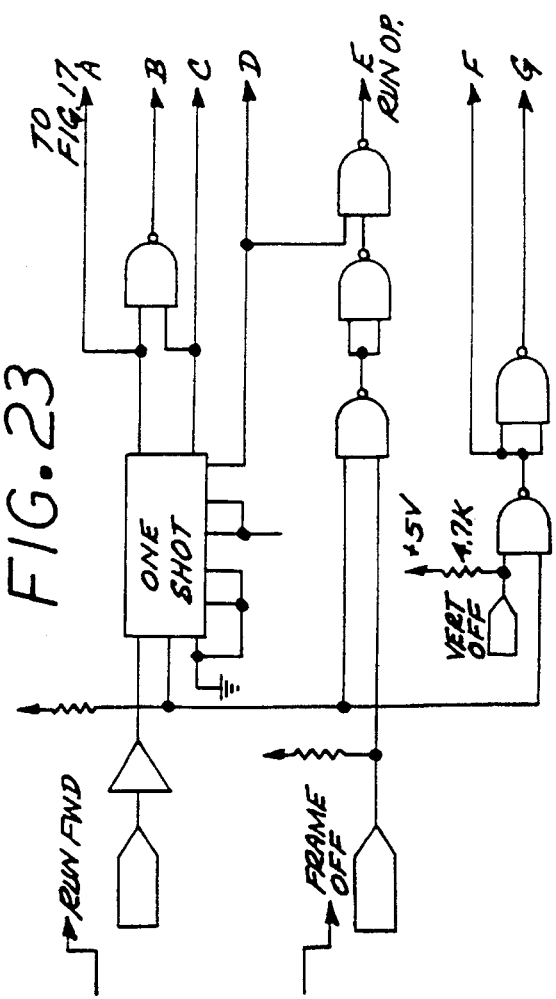

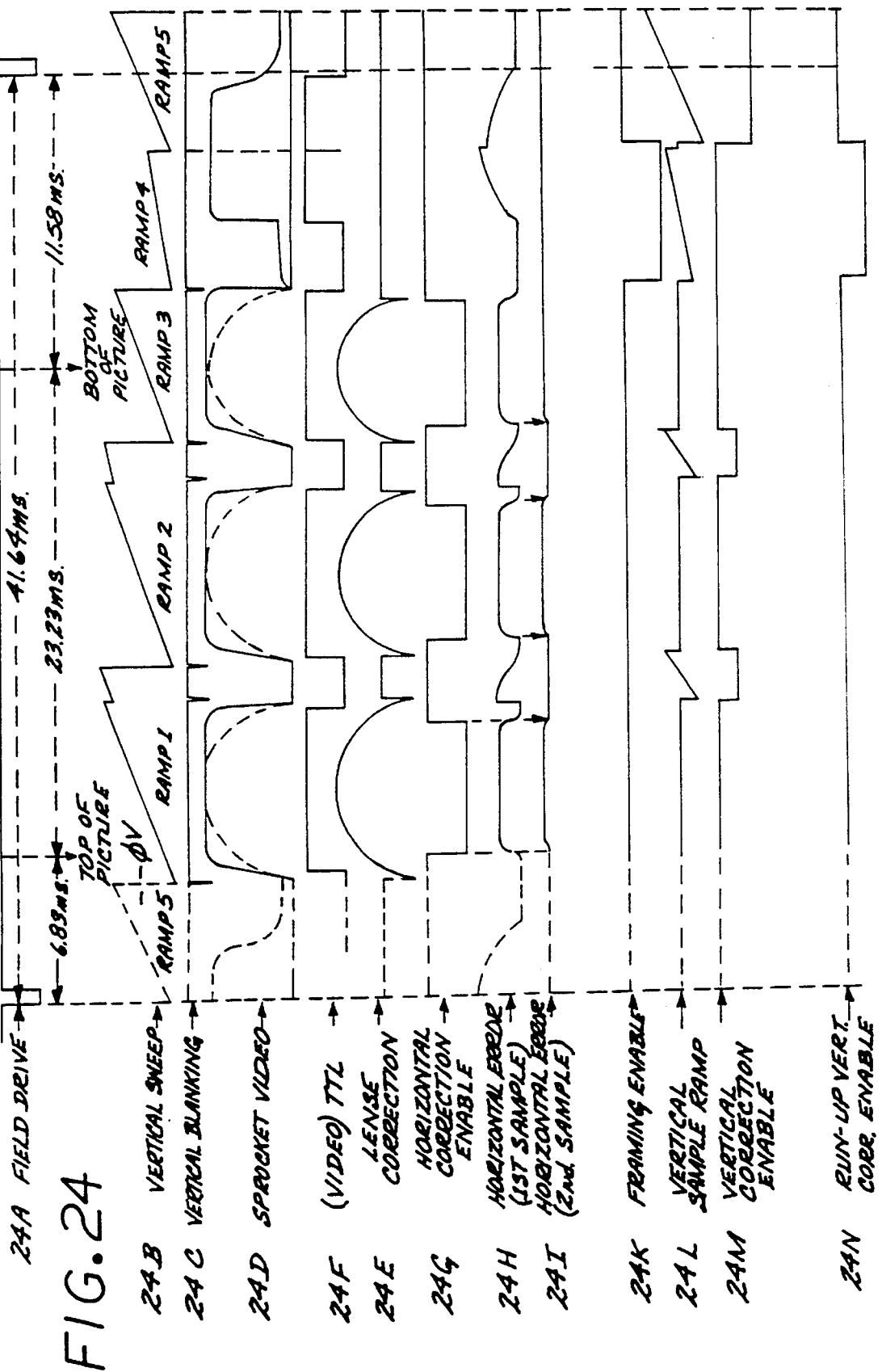

FILM WEAVE CORRECTION SYSTEM

RELATED APPLICATIONS

This is a continuation of application serial No. 259,125, filed Oct. 18, 1988, which is a continuation of application Ser. No. 142,854, filed Dec. 15, 1987, now abandoned, which in turn was based on international application serial No. PCT/US87/02234, filed Sep. 3, 1987, designating the United States, which in turn was a continuation-in-part of U.S. application Ser. No. 904,035, filed Sep. 4, 1986, now abandoned.

A portion of the disclosure of application Ser. No. 904,035, filed Sep. 4, 1986, contains computer appendix material which is subject to copyright protection. The copyright owner has no objection to the facsimile reproduction by anyone of the patent application document or the patent disclosure, as it appears in the Patent and Trademark Office patent file or records, but otherwise reserves all copyright rights whatsoever.

BACKGROUND OF THE INVENTION

1. Field of the Invention

The present invention is related to film weave correction systems and more specifically to correcting for horizontal and vertical weave in systems for projecting or transferring film-to-video or video-to-film.

2. Related Art

It is common knowledge that motion pictures are produced by sequentially recording a series of discrete images which are related in time. The initial motion is recorded at a predetermined rate so that the recorded images can be reproduced to give the same motion by projecting or displaying the images at the predetermined rate. Present movie cameras for recording original film are relatively accurate in recording the images at the predetermined rate. For example, 16 mm and 35 mm cameras record images on the film at a rate of 24 frames per second.

Proper positioning of each frame on the film is also important for proper playback of the film. In a movie camera, proper positioning, or registration, of each frame is done by pulling the film down across the lens and aperture and momentarily stopping the film and refixing the frame by fitting one or more pins in the sprocket hole associated with the frame. The frame is then exposed with light through the lens. After the pin is disengaged from the sprocket hole, the film is advanced until the next frame is presented before the lens and aperture. The process is then repeated. The process is repeated at a rate of 24 frames per second, and the frame is registered with respect to the lens and aperture in both vertical and horizontal directions by registration of the pin or pins with the sprocket holes corresponding to each frame. In some systems, sprocket holes on different sides of the film are used for horizontal and vertical registration. Typically, sprocket holes of the Bell and Howell or Cathedral type are used for registration of film. Cameras of current design provide for relatively accurate registration of the film during filming. An optical recorder operates in a similar manner.

Registration through pins may be accomplished either by placing the sprocket holes over one or more pins or by feeding the film into a gate and inserting one or more pins into the sprocket holes of the film. In either case, this process results in recording of the image on the respective frame using the sprocket hole as a reference point. In those projectors where the pin is large enough to contact all four edges of the sprocket hole, the film will be registered in both the vertical and horizontal directions. In those cameras where the registration pin contacts only the upper and lower edges of the sprocket hole, the film frame is registered in a vertical direction by the registration pin and in the horizontal direction by an edge guide against which one edge of the film is pressed.

Replay of the motion picture, for viewing or copying, can take several forms. When the film is in the form of production prints obtained from the original negative, for use in movie theaters, the projector advances the film at the rate of 24 frames per second and registers each frame by combining a sprocket hole with a registration pin or by a combination of sprocket hole registration and edge guiding. In either case, exact registration of the film is limited by the 0.010 mm tolerance in the sprocket hole width and height inherent in each sprocket hole and by the wear that inevitably results by repeated use of pin registration. In a situation where edge guiding is used, the edge guides produce wear on the edges of the film which increases any error being produced during playback of the film. However, each time the film is passed through a sprocket assembly, the edges of the sprocket hole undergo a certain amount of wear, which accumulates with each pass of the film over the sprocket. Therefore, exact registration of the film becomes more and more difficult and the vertical and horizontal weave perceived during playback of the film increases.

During film-to-video transfer or film-to-film transfer, the same problems arise with respect to vertical and horizontal weave. In film-to-film transfer, both the original film and the film to be exposed must be registered to provide suitable image transfer. For film-to-video tape transfer, telecine machines are used to transfer picture information from 35 mm movie film, or other film, to video, formatted for television. One such apparatus is the Rank Cintel telecine apparatus, such as the Mark III C Telecine manufactured by Rank Cintel Ltd. This is a continuous-motion or real-time flying spot scanning telecine apparatus which can transfer film information to video on a real-time basis, e.g., 24 frames per second. This apparatus will be referred to as the Rank Cintel apparatus.

The Rank Cintel apparatus takes 35 mm or 16 mm film and uses a Rank Cintel cathode ray tube (Rank CRT, or Rank scanner) to scan the film, on a frame-by-frame basis, in a noninterlaced fashion. The picture information, i.e. the information recorded on each frame of the film, modulates the light beam from the flying spot scanner and produces voltage variations in a series of photomultiplier tubes. The resulting signal is stored in a digital signal processor (digiscan) and thereafter stored as video signals on an appropriate medium, such as video tape. The video signals are stored on the video tape in an interlaced fashion according to the American standard of 30 frames per second, 2 fields per frame. By way of example, film scanned by the Rank Cintel apparatus at a speed of 24 film frames per second is digitized and stored as a video signal, and is clocked out through a 2–3 sequencing arrangement to be 30 video frames per second as is known in the art. (It will herein be understood that the same comments with respect to use of the Telseine apparatus apply to use for the European standard of 25 frames per second with appropriate changes in scanning speed, video storage format, et cetera.)

With the telecine apparatus, the film is edge guided to minimize horizontal weave. Additionally, vertical movement is monitored by a tachometer sprocket which senses the passage of the first sprocket hole at the beginning of each frame and adjusts the capstan drive to correct for framing error. The sprocket holes used for registering the film in the movie camera are otherwise unused for registration of the film during the film-to-video transfer process. This is especially significant where the film was originally registered using only the sprocket holes as opposed to a combination of the sprocket holes with edge guiding. This minimal film registration produces noticeable vertical and horizontal weave in the video signal when the signal is displayed on a video monitor. As with many other display modes, the edges of video monitor provides a reference point which accentuates any vertical or horizontal weave which may have occurred during the transfer process. The use of mattes or keys also easily points out problems in film positioning. In compositing, or for example where a title is added to picture information, the title is stationary, and any weave or vertical drift in the picture information is readily seen relative to the fixed title.

One solution to the film registration problem is to provide film pulldown as in typical movie cameras and projectors followed by scanning of each frame of the registered film with a flying spot scanner. The Rank Cintel telecine apparatus is modified by removing the Rank film gate and substituting a film gate which provides intermittent film pulldown and registration of the film before the flying spot scanning beam. However, the film-to-video transfer is limited to 40 frames per minute. This works out to less than one frame per second. This intermittent pulldown followed by mechanical registration with the sprocket holes is inherently inaccurate because of movement of the film caused by the registration pins or by wear on the sprocket holes caused by the pins.

Where the film is physically guided through a telecine apparatus on a real-time basis, the film can be edge-guided, in perceptible weave or vertical drift in the resulting transferred picture due both to wear on the edge of the film and to the fact that the original frames were most probably registered through the sprockets rather than the film edge. In the most common arrangement, the film is capstan-driven and is not registered in any way. This results in a more significant amount of horizontal and vertical weave in the film. This is the case even where the capstan-driven Rank apparatus may still have correction for vertical drift of the film because the vertical correction is dependent upon the mechanical tolerances of the capstan and the film.

U.S. Pat. Nos. Holland, 4,104,680, Goldmark, 3,234,326, Pickstock, 3,780,222, and McMann, 3,856,987, attempted to solve the problem of film registration. Rather than mechanically register each frame with a sprocket hole, these inventors electronically or optically sensed a sprocket hole or synchronization mark on the film for each frame to be scanned. Holland uses the electron beam used to scan the picture information in each frame to sense a sprocket hole. Using the same beam severely limits the amount and integrity of the information produced through the electron beam and the sprocket hole.

Goldmark uses a separate light source to detect pips or optically recorded marks on the film adjacent each scan line. Goldmark suffers the same problems of resolution and integrity of information as does Holland. McMann also uses a separate light source to produce a signal upon the passing of a synchronization mark formed in the film. Goldmark and McMann both address the problem of vertical drift. Pickstock uses the flying spot scanner for the picture information to detect a synchronization mark for correcting weave.

It should be noted that the above-described aspects of film transfer apply to telecine apparatus throughout a range of film rates, such as between 16 and 30 frames per second. They also apply to apparatus for transfer of video to film, use of electron beams for moving picture information transfer, laser transfer, and other apparatus where film registration is desirable.

SUMMARY OF THE INVENTION

A real-time, registered moving picture apparatus includes a scanner for scanning the film area of a film at a film plane. The film area contains information, such as picture information. A film drive moves the film along the film plane. Scanning means Separate from the scanner scans a film reference point in the film for determining a location of the film reference point. The film reference point may either be a sprocket hole in the film or some other type of synchronization or identifying mark registered or otherwise positioned in a predetermined fashion with respect to the film frame. Means are coupled to the film reference point, scanning means for changing a relative position of the film area and the scanner.

In one form of the invention, a flying spot scanner scanning the film area containing the picture information is adjusted relative to the film area. The flying spot scanner can be adjusted to correct for vertical weave or for horizontal weave. In another form of the invention, the film itself is adjusted to a new position relative to the flying spot scanner to scan the picture information, rather than adjusting the scanner. The correction for film movement can be accomplished without affecting the function or operation of the flying spot scanner, such as the Rank CRT. For example, the X and Y movement of the Rank raster, the zoom capability of the Rank raster, and the shuttle speed of the Rank Cintel apparatus are unaffected and can operate normally.

Film correction can be carried out at various frame rates and on various types of film. For example, correction can be carried out for frame rates between 16 and 30 frames per second or higher. Correction can also be carried out on 16 mm film as well as 35 mm film. Correction for film registration can be applied for film movement in the reverse direction, as well as in the forward direction and even in the stop mode when a film frame is supposed to be centered in the film gate. Correction is done on a real-time basis without film pulldown and mechanical registration.

In one embodiment of the invention, a separate flying spot scanner or CRT is used to scan the sprocket holes on the film being processed. This allows for scanning of each sprocket hole a multiple of times and updating of the position of the film an equal number of times. The existing Rank telseine apparatus is easily modified by adding a 1-inch-diameter flying spot CRT assembly. The Rank telecine apparatus is easily retrofit with the current design.

The optics in the Rank Cintel apparatus is such that the Rank Cintel CRT beam does not interfere with the correction flying spot scanning CRT, and vice versa. After scanning the film, the beam from the correction CRT is diverted away from the beam from the Rank CRT. In one embodiment of the invention, the Rank CRT beam is predominantly green, while the correction CRT beam is predominantly blue.

Correction of the Rank CRT raster to change the position of the raster can be easily done by adding an additional deflection coil to the Rank CRT. This provides effectively instantaneous modification of the Rank raster. This is preferred over applying a correction signal to the horizontal or vertical deflection coils of the Rank raster because correction occurs faster using a separate coil.

In another embodiment of the invention, the correction information is used to adjust the framing of the film passing through the Rank gate assembly by adjusting the capstan drive/servo mechanism of the Rank Cintel apparatus.

The processing system for processing the sprocket information from the correction CRT can be carried out through a hardware system or through a software or firmware implemented system. Software implementation is preferred to minimize drift in multivibrators and other analog components. Additionally, a software implementation allows easy adjustment for different film speeds, different film types, etc., and decreases the hardware required for generating various signals.

For 35 mm film at 24 film frames per second, three sprocket holes for each frame are scanned for horizontal weave correction information. The fourth sprocket hole is scanned for framing and vertical correction information to be used for the next succeeding film frame. For different film frame rates, it may be possible to omit scanning of one or more of the sprocket holes.

The initial sprocket information-from the film plane is an analog video signal, i.e., a time-dependent voltage signal. Since the flying spot scanner beam must pass through a Rank lens near its edge, shading occurs in the output signal. Therefore, a lens-shading correction is made to the sprocket video signal to correct the video signal. The sprocket video information is then converted to a TTL signal for digital processing.

Because many films are formed with Bell & Howell (or Cathedral) sprocket holes, the horizontal position of the film is obtained from the crest or center portion of the Cathedral sprocket hole adjacent the film frame. This is done by noting the edge crossing at the center of the Cathedral sprocket hole as the flying spot scanner line crosses the edge of the sprocket hole. Vertical and framing information is obtained by scanning across the leading horizontal edge of the fourth sprocket hole. These edge-crossing signals, converted to TTL form, are used to sample a voltage versus time ramp to produce a d.c. voltage signal. The d.c. voltage signal for horizontal or vertical correction is applied to the retrofit deflection coil on the Rank CRT. The d.c. voltage signal for framing correction is applied to the capstan drive apparatus on the Rank Cintel. Error correction is carried out on the TTL signals to correct for lens effects due to passage of the correction CRT beam through the outer perimeter of the lens and to correct for pulses occurring due to foreign matter such as dust or lens imperfections in the light path between the correction CRT and the film.

Scanning by the correction CRT is controlled by the line drive and frame drive from the Rank Cintel apparatus. During blanking intervals of the correction CRT, no correction signals are available. Sample and hold circuits maintain the previously applied correction signals to the Rank Cintel servo mechanism or to the Rank Cintel CRT.

Production of the sprocket video information and the signal processing of the sprocket video information can be carried out for frame rates different from 24 frames per second by appropriate modification of software parameters. For example, vertical deflection ramps for the correction CRT can be determined empirically and stored as software control instructions as a function of the frame rate.

Use of a separate flying spot scanner for obtaining sprocket or other edge synchronization information is beneficial in that retrofit of existing systems is facilitated. A focused beam can be used to make multiple scans of a single sprocket perforation. Additionally, the operation of the Rank Cintel CRT is unaffected by the correction flying spot scanner.

Use of a photomultiplier tube for sensing the beam from the correction flying spot scanner provides for a high-gain, low-noise high frequency sensor. A fiber optic cable is used to transmit the sprocket information from the film gate of the Rank Cintel to the photomultiplier tube.

The digiscan system in the Rank Cintel apparatus can be used to ensure proper sequencing when compositing is carried out at 24 film frames per second, for example, to transfer to video at 30 video frames per second or from any other film frame rate.

For modification of existing telecine apparatus, a kit can be provided for focused beam scanning of film frame registration information. This would include a separate flying spot scanner, film gate apparatus including a milled film gate, and a light-reflecting prism to reflect the sprocket video information. A separate deflection coil for mounting on the Rank Cintel CRT is included. Digital memory and associated signal-processing information is also included. A fiber optic light guide and photomultiplier tube would be used to transfer the sprocket video information from the prism to the signal processing equipment.

BRIEF DESCRIPTION OF THE DRAWINGS

FIG. 13 is a partial schematic and circuit diagram for applying a lens offset signal to the horizontal deflection circuit, and for providing a vertical deflection signal to the correction cathode ray tube;

FIG. 19 is a partial schematic block diagram and electronic circuit for filtering video TTL signals;

FIG. 20 is a schematic block diagram showing a digital circuit for triggering a vertical correction signal;

FIG. 21 is a schematic block diagram showing an electronic circuit for triggering framing correction signals;

FIG. 23 is a partial schematic diagram and electronic circuit showing a switch arrangement for controlling of vertical and framing correction signals during start of film movement;

FIGS. 24A–24N show a revised set of curves similar to those shown in FIGS. 8A–8M.

DETAILED DESCRIPTION OF THE PREFERRED EMBODIMENTS

I. Modification of the Film Transfer Apparatus

Figure 1:
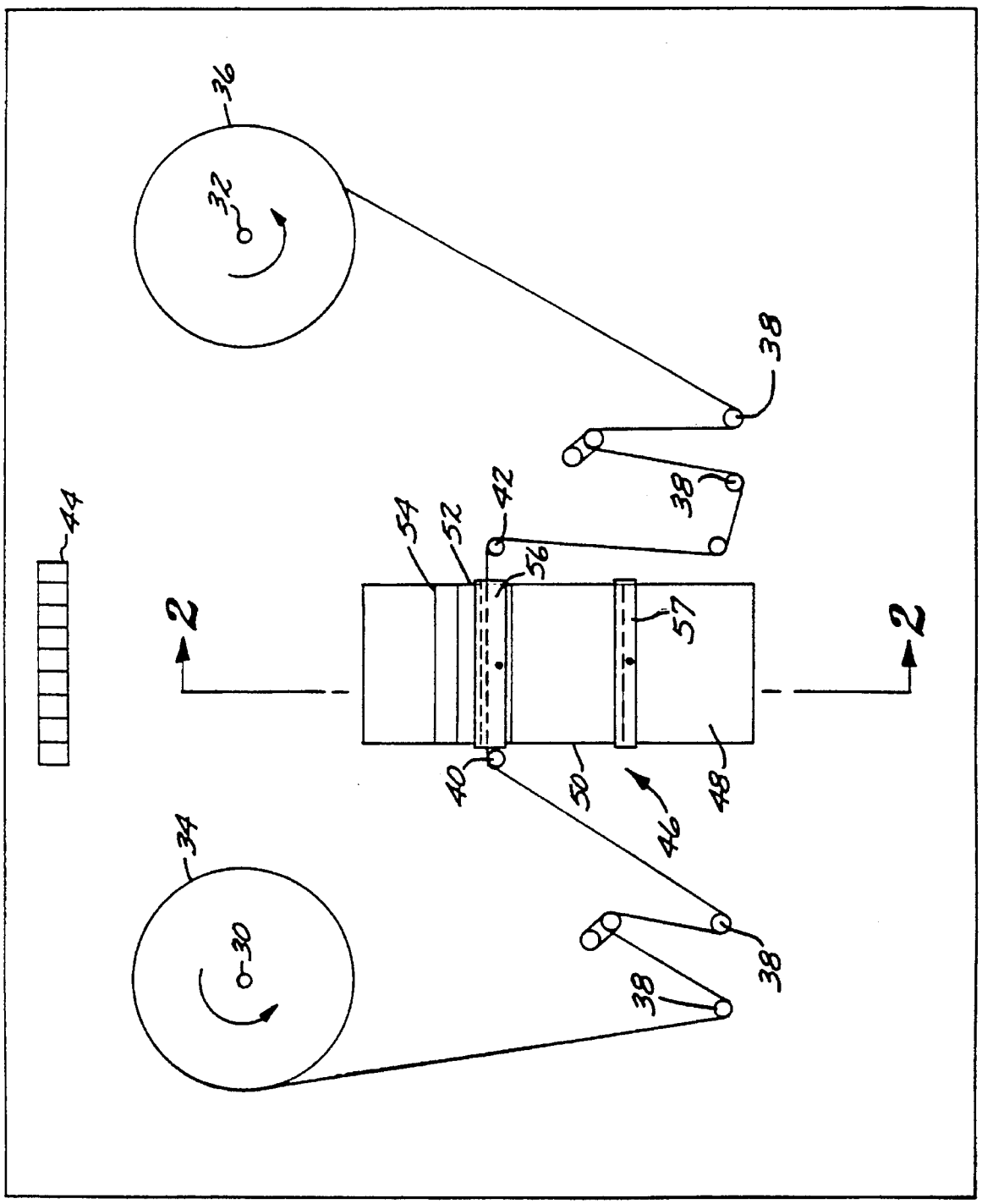
FIG. 1 is a schematic and front elevation view of a telecine apparatus.

FIG. 1 shows a schematic of a telecine apparatus such as that manufactured and sold by Rank Cintel. The telecine includes a first film spindle 30 and a second film spindle 32. The spindles mount a supply reel 34 and a takeup reel 36 comprising part of a film drive system. The film drive system includes a plurality of film rollers 38, five of which are shown in FIG. 1. It is to be understood that the film drive system can have as many as ten rollers. The film drive system further includes a tachometer sprocket 40 for sensing the linear speed of the film and forming part of a servo mechanism for maintaining the framing of the film in the film gate assembly. Framing is that process whereby each frame of the film is correctly positioned in the film gate for exposure to the beam from the flying spot scanning beam of the Rank CRT. The film drive system also includes a film drive capstan and motor assembly, shown schematically at 42. The telecine apparatus also includes a frame counter 44.

An optical system 46 is mounted in the telecine apparatus in the path of the film. The optical system includes a mirror housing 48, a gate housing 50, a lens housing 52, and a second mirror housing 54. A first light-blocking door 56 covers the area between the film gate housing and the lens housing to block ambient light and prevent the light from entering the area where the film is being scanned. A second light-blocking door 57 covers an open area formed between the mirror housing 48 and gate housing 50 for viewing the scanners.

Figure 2:
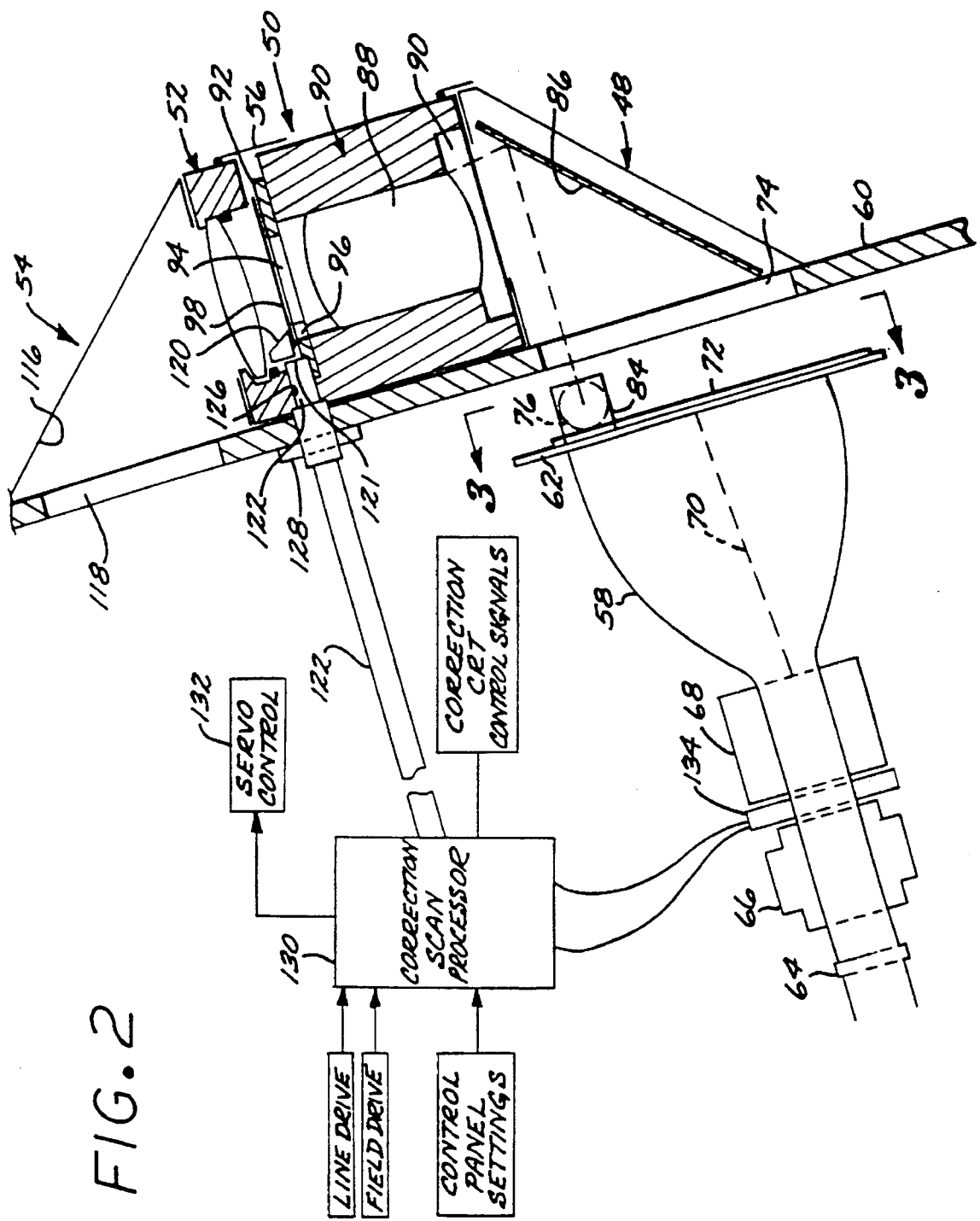
FIG. 2 is a schematic and partial side sectional view of a modified telecine apparatus according to the present invention.

FIG. 2 shows a portion of the telecine apparatus of FIG. 1. The telecine apparatus includes the standard Rank CRT 58 mounted to the backside of a face or deck plate 60 by a bezel 62 for scanning images on-film in the film plane. The Rank CRT includes the standard centering magnets 64, the standard focus coil 66, and the standard deflection yoke 68. These devices control the flying spot scanner beam indicated as 70, as is well-known in the art. The beam impacts the face 72 of the CRT. The control circuits for the centering magnets, focus coils, and deflection yoke are not shown.

An opening 74 is formed in the face plate for passing the Rank flying spot beam into the first mirror housing 48. A second flying spot scanner, in the form of a correction CRT 76, is mounted to an upper part of the bezel 62. The correction CRT is a focused beam device for scanning a film edge in the film in the gate assembly for determining the location of the film edge as a reference point. For example, the film edge may be one edge of a sprocket hole used to register the film containing the picture frame being scanned by the Rank CRT 58. In the present embodiment, the film edge is each of the series of sprocket holes adjacent the audio track area of the film. The correction CRT is preferably one similar to the Westinghouse high-performance one-inch CRT assembly, Model No. WX-34250, and has a P47 phosphor. The P47 phosphor is a predominantly blue phosphor and may differentiate from the P48, predominantly green, phosphor of the Rank CRT. A P46 phosphor, predominantly green, may also be used and has a relatively high-intensity output. This CRT is a high intensity, high resolution scanner. The correction CRT is controlled by the line drive and frame drive of the Rank system as described more fully below.

Figure 3:
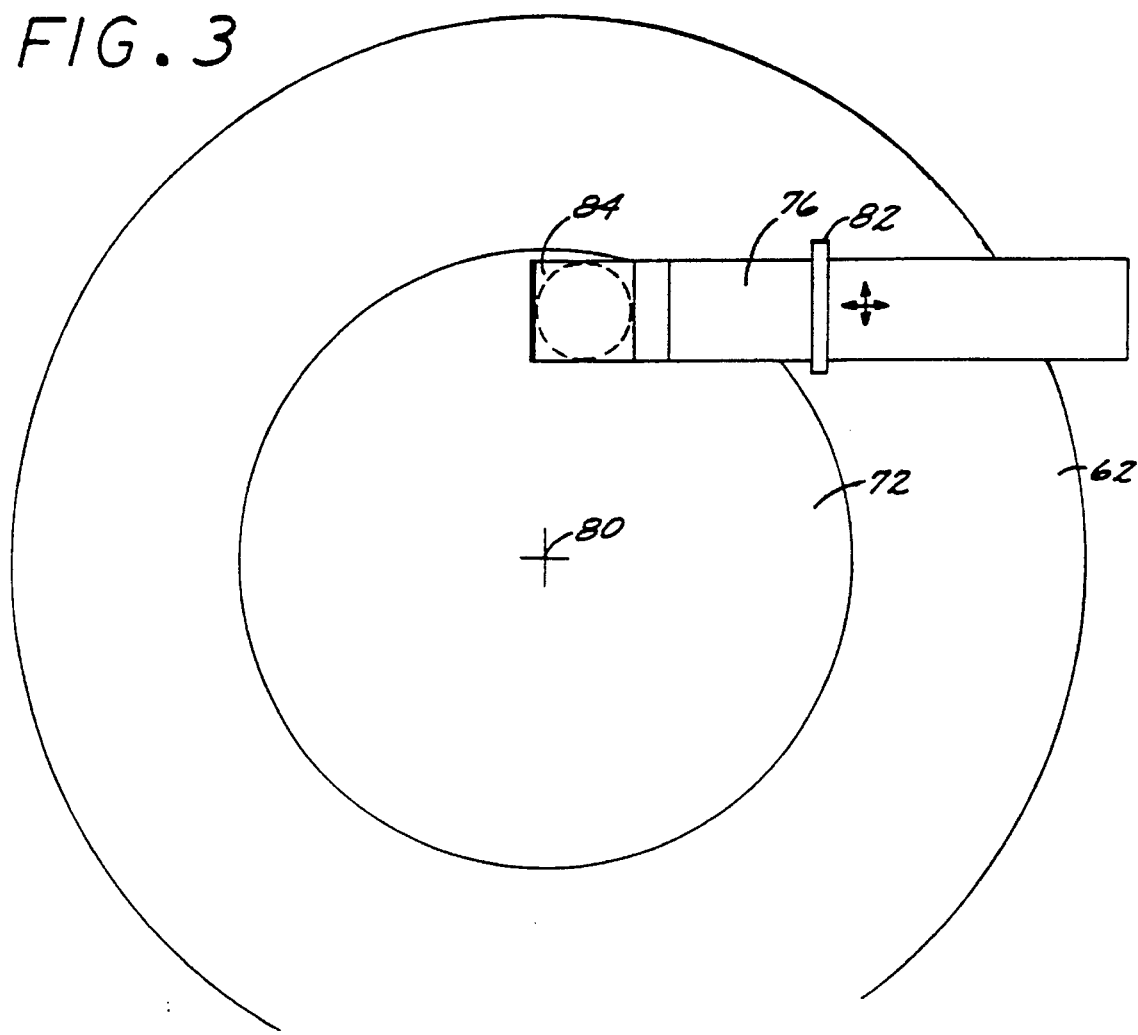
FIG. 3 is a front elevation view of a flying spot scanner for scanning picture information and a separate flying spot scanner for scanning film edge information.

As shown in FIG. 3, the correction CRT 76 is mounted to the bezel 62 for projecting a beam out of the sprocket area of the film. The correction CRT is mounted at the periphery of the Rank CRT so that a portion of the face 72 of the Rank CRT is obscured. However, with the present design of the Rank Cintel system, the CRT and mirror mount 78 do not obstruct the optical path of the Rank beam. The correction CRT extends along a chord parallel to the CRT face 72. The body of the correction CRT extends over a portion of the bezel 62. The correction CRT is adjustable axially, rotationally, in a direction outward away from the face of the CRT (and the plane of the drawing) and also in a direction away from the center 80 of the Rank CRT, i.e., to the top of the drawing as viewed in FIG. 3. The correction CRT is adjustable through a CRT adjustment bracket 82 for focusing the beam on the film plane, for centering the beam of the correction CRT with respect to the film edge as discussed below and for aligning the horizontal and vertical sweeps.

In order to mount and position the correction CRT, the burn corrector of the Rank apparatus was removed to accommodate the correction CRT. The burn corrector sensor is replaced by one or more fiber optic light guides directed at the face of the Rank CRT. The opposite ends of the one or more light guides are coupled to a photomultiplier system which is then coupled through appropriate circuitry to the burn correction system of the standard Rank system. It is felt that the use of a fiber optic light guide as a substitute for the burn corrector enhances the effectiveness of the burn correction system of the Rank apparatus.

A 45° mirror 84 is positioned directly in front of the face of the correction CRT and mounted to the bezel. The face of the correction CRT 76 is shown in phantom in FIG. 2, and the reflection of the face of the correction CRT is shown in phantom in FIG. 3. The beam from the correction CRT is reflected through an angle of 90° by the 45° mirror so that the beam travels in a direction parallel to the Rank flying spot beam.

When the Rank Cintel apparatus is normally assembled, the Rank CRT is focused through various optics, to be described below, onto the plane of the film passing through the film gate. The correction CRT is adjusted axially so that the reflection of the correction CRT beam is also focused on the film plane. The film plane is taken to be the plane of the film passing through the film gate, to be described more fully below. By maneuvering the correction CRT in this manner, the correction beam can use the standard optics in the Rank Cintel apparatus to scan the sprocket hole or any other edge associated with the film in the film plane.

The first mirror housing 48 encloses a 45° mirror 86 (FIG. 2) for reflecting both the Rank flying spot beam and the correction flying spot beam into the standard Rank Cintel lens 88 mounted in a lens housing 90 in the 35 mm film gate assembly 50. The gate assembly, and therefore the lens and lens mount, are mounted above the first 45° mirror housing 48 so that the Rank beam and the correction beam are directed upward with respect to the telecine apparatus toward the film.

Figure 5:
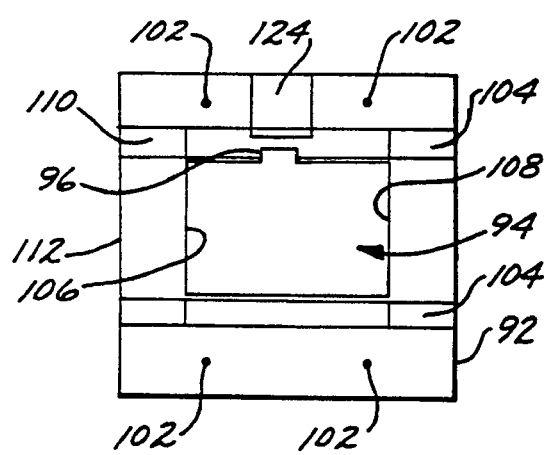
FIG. 5 is a plan view of a modified skid plate for a film gate assembly for use in the telecine apparatus of FIGS. 1 and 2.

A skid plate 92, described more fully below with respect to FIG. 5, is mounted across the top of the lens mount 90 and includes a rectangular opening 94 for passing the Rank CRT beam. The skid plate is a standard Rank Cintel skid plate with several modifications. The first modification is a rectangular window 96 formed adjacent to the rectangular opening 94 for passing the correction CRT beam. The film 98 passes over the skid plate from above the plane of FIG. 2 down into the plane of FIG. 2. The film may be positive or negative films or variations on those, the difference being only the relative optical density of the film. The film 98, in passing over the skid plate, defines a film plane corresponding to the plane of the film on the skid plate. Both the Rank CRT beam and the correction CRT beam are focused onto this film plane. The original edge guides on the Rank skid plate are retractable so that no edge guiding occurs during horizontal and vertical error scanning.

Figure 4:
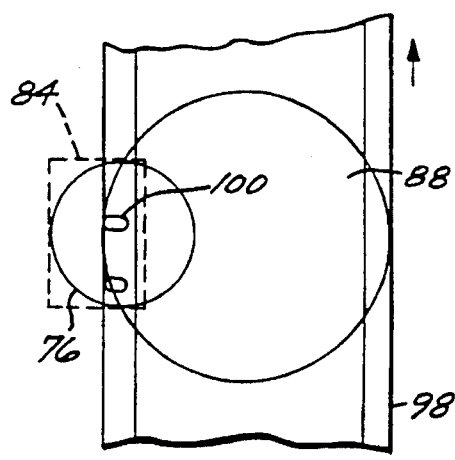
FIG. 4 is a schematic and plan view of a portion of a film and depicting a scanner for sprocket of the film.

If one were to view the film from above the film plane, without the lens housing 52 and the second mirror housing 54, and if the skid plate 92 were absent, one would have a view similar to that shown in FIG. 4. The sprocket holes are not to scale. FIG. 4 shows the 45° mirror 84 in phantom to indicate that portion of the correction CRT 76 which is reflected by the mirror 84, the mirror 86 then transmitted by lens 88. As a result, that portion of the correction CRT shown in FIG. 4 extending into the field of the Rank CRT and outside of the phantom lines of the mirror is not transmitted to the film frame. As the film 98 passes through the film gate, the Rank CRT scans each frame in a non-interlaced fashion, as is known in the art. Simultaneously therewith, the correction CRT 76 scans each sprocket hole 100 which passes over the rectangular opening 96 in the skid plate.

FIG. 4 also shows a source of error for the correction-scanning process. As shown in FIG. 2, the correction CRT beam is reflected from the first 45° mirror 86 into the Rank lens 88. Because of the positioning of the correction CRT, the beam is reflected to a location adjacent an edge of the Rank lens. This produces edge effects or shading in the beam from the correction CRT, which affects the signal obtained after the correction CRT beam passes the sprocket hole. The edge effects are one reason for scanning the inside edges of the sprocket holes. Correction for the lens effects is described more fully below.

FIG. 5 shows a top plan view of the modified skid plate 92. The skid plate includes at least a pair of mounting holes 102 on each side of the skid plate for mounting the skid plate to the lens mount 90. The mounting holes are outside the area over which the film passes. The skid plate includes a pair of ridges 104 raised from the surface of the skid plate, one ridge on each side of the rectangular aperture 94. In the modified form of the skid plate, relative to the Rank Cintel skid plate, that portion of each ridge between the first edge 106 and the second edge 108 of the aperture are milled to have less of an arc or curvature than the original skid plate ridges. This allows for more accurate focusing of the Rank CRT beam over a larger portion of the film plane along which the film passes, but still minimizes flexing or bending of the film. This also allows for more accurate focusing of the correction CRT beam on the edge or sprocket being scanned.

The rectangular opening 96 formed for the correction CRT beam is milled from a third edge 110 of the standard Rank skid plate. The aperture is milled into the third edge a distance of 0.065 inch deep and begins 1.055 inch from the upstream edge 112 of the skid plate. The aperture extends 0.190 inch away from the upstream edge 112 toward the downstream edge. The aperture extends all the way through the thickness of the skid plate. This defines a window for the beam from the correction CRT. The width of the ridge 104 from which the rectangular opening 96 is formed is 0.200 inch. The width of the opposite ridge is 0.225 inch. The distance of the latter ridge from the adjacent side of the skid plate is 0.483 inch. The length of the adjacent side is 2.362 inches. The distance from the first ridge, from which the rectangular opening is milled, to its adjacent side is 0.415 inch. The rectangular opening for the Rank CRT beam is 1.420 inch parallel to the direction of movement of the film and 0.960 inch perpendicular thereto. The upstream and downstream edges 106 and 108, respectively, of the opening are each 0.471 inch from the respective outer edges of the skid plate.

A milled-out portion 124, described below, is formed in the external side surface of the skid plate adjacent the rectangular opening for the correction CRT beam. The milled-out portion is partly cylindrical and accepts the portion of the end of a fiber optic light guide, described more fully below. The center of the milled-out portion is 1.150 inch from the upstream edge of the skid plate and 1.224 inch from the downstream edge of the skid plate. The milled-out portion extends 0.250 inch inward toward the opening for the correction beam. The maximum width of the milled-out portion from upstream to downstream is 0.315 inch. The entire width of the skid plate, transverse to the direction of motion of the film, is 2.283 inches.

The window for the correction beam and the milled-out portion for the fiber optic light guide are off-center with respect to the upstream and downstream edges of the skid plate. This allows vertical and horizontal error correction, even when the film is stopped and a frame is positioned over the rectangular aperture 94 in the skid plate. As can be seen by considering the film shown in FIG. 7, there is no sprocket hole at the exact center of the frame. However, the third sprocket hole of each frame would be positioned over the correction CRT beam aperture when the film is stopped. This allows for vertical and horizontal correction while the film is stopped, as described more fully below.

The skid plate described above is suitable for "full aperture" film. A drop-in plate (not shown) can be provided for the skid plate to accommodate Academy aperture film. Academy aperture film is film such as that shown in FIG. 7 having a soundtrack area between one side of the film area and the adjacent sprocket holes. An opening is still provided for the correction CRT beam. However, the drop-in plate will cover the soundtrack area of the Academy format film.

Considering FIG. 2 again, the Rank Cintel apparatus includes the standard lens housing 52 with a condensing lens 114 passing the Rank CRT beam into the second mirror housing 54 to be reflected by a second Rank 45° mirror 116, which reflects the light through a 90° angle to be passed into the Rank cell box for conversion into a video signal, as is known in the art. The reflected light passes through an aperture 118 in the face plate 60.

The lens housing is modified by the addition of a 90° prism 120 with one face of two perpendicular faces directly over the aperture 96 for passing the correction CRT beam, and the other right angle face facing toward the face plate 60 to the exposed end 121 of a 24 inch, one-quarter inch diameter fiber optic light guide 122.

The 90° prism extends 1.5 millimeters above the flat surface of the skid plate and is 9.5 millimeters deep extending into the plane of FIG. 2 and approximately 9.5 millimeters along the adjacent sides. The highest portion of the prism is 6.5 millimeters, the bottom of the prism extending 1.4 millimeters below the bottom surface of the condensing lens assembly. The top of the prism may be truncated to avoid having to make any modification to the condensing lens assembly. The second perpendicular face of the prism extends a distance of 3.75 millimeters from the extreme left edge, as seen in FIG. 2, of the condensing lens. The bottom of the condensing lens assembly is 2.3 millimeters above the top of the flat portion of the skid plate.

The exposed end of the fiber optic light guide 122 is positioned approximately 1 millimeter from the second perpendicular face of the prism. The end of the light guide is positioned in the film gate assembly on a milled-out portion 124 of the skid plate (FIG. 5). The end of the light guide is also positioned under the Rank condensing lens assembly in a milled-out portion 126. The fiber optic light guide is mounted to the face or deck plate 60 by closing the condensing lens assembly over the skid plate and passing the end of the fiber optic light guide through the face plate toward the prism 120. When the light guide is as close as possible to the prism, the light guide is fastened to the face plate by a connector case clamp 128. The fiber optic light guide extends from the second perpendicular face of the prism to a correction scan processor 130, which provides correction signals to the standard servo control 132 of the Rank Cintel apparatus. The processor also controls a horizontal and vertical error correction coil 134 mounted between the focus coils and the deflection yoke of the Rank CRT. The correction coil is preferably a Syntronic type B3072 electromagnetic beam-centering device one-half inch thick having two separate windings oriented 90° apart, one winding for horizontal and the other for vertical. The horizontal and vertical coils in the correction coil are coupled to the processor in such a way that their impedances are matched. The coil provides rapid and accurate correction of the Rank raster for correcting the scanning of the corresponding film frame as a function of the scanning of the sprocket hole or other edge reference.

The scan processor includes a photomultiplier tube, having the preamp in its base for minimizing noise, coupled to the output of the light guide for sensing the correction CRT beam transmitted by the light guide. The scan processor also includes signal-processing apparatus for processing the output of the photomultiplier tube. This apparatus and the method associated with the apparatus are described more fully below.

In operation, the Rank CRT and the correction CRT are controlled by Rank line drive and Rank frame drive, as described more fully below. The Rank CRT scan is the same as for the standard Rank Cintel apparatus. The correction CRT scan, as would be viewed from a position such as that represented by FIG. 2, would be horizontally from left to right and vertically from bottom to top. These two beams are reflected by the first 45° Rank mirror 86, into the Rank lens 88. The correction CRT beam passes through, and is focused by, the Rank lens 88 and passes through the window or aperture 96 milled in the 35 mm skid plate. For correcting horizontal weave, the beam scans the crest portion of the sprocket hole adjacent the image portion of the film. For vertical and framing correction, the beam scans both the top and bottom, respectively, of the fourth sprocket hole. The beam is modulated by the respective edges of the sprocket hole, as described more fully below, and then passed into the prism 120. The beam is bent 90° and passed into the end of the fiber optic light guide 122. The fiber optic light guide is positioned with respect to the prism so that the correction beam passes into the center of the light guide when the beam is at the center of the correction CRT. The light guide transmits the modulated light to the correction scan processor where it is corrected and processed, as described more fully below. D.c. voltages are produced from the processor to control the servo control 132 and/or the correction coil 134.

Figure 7:
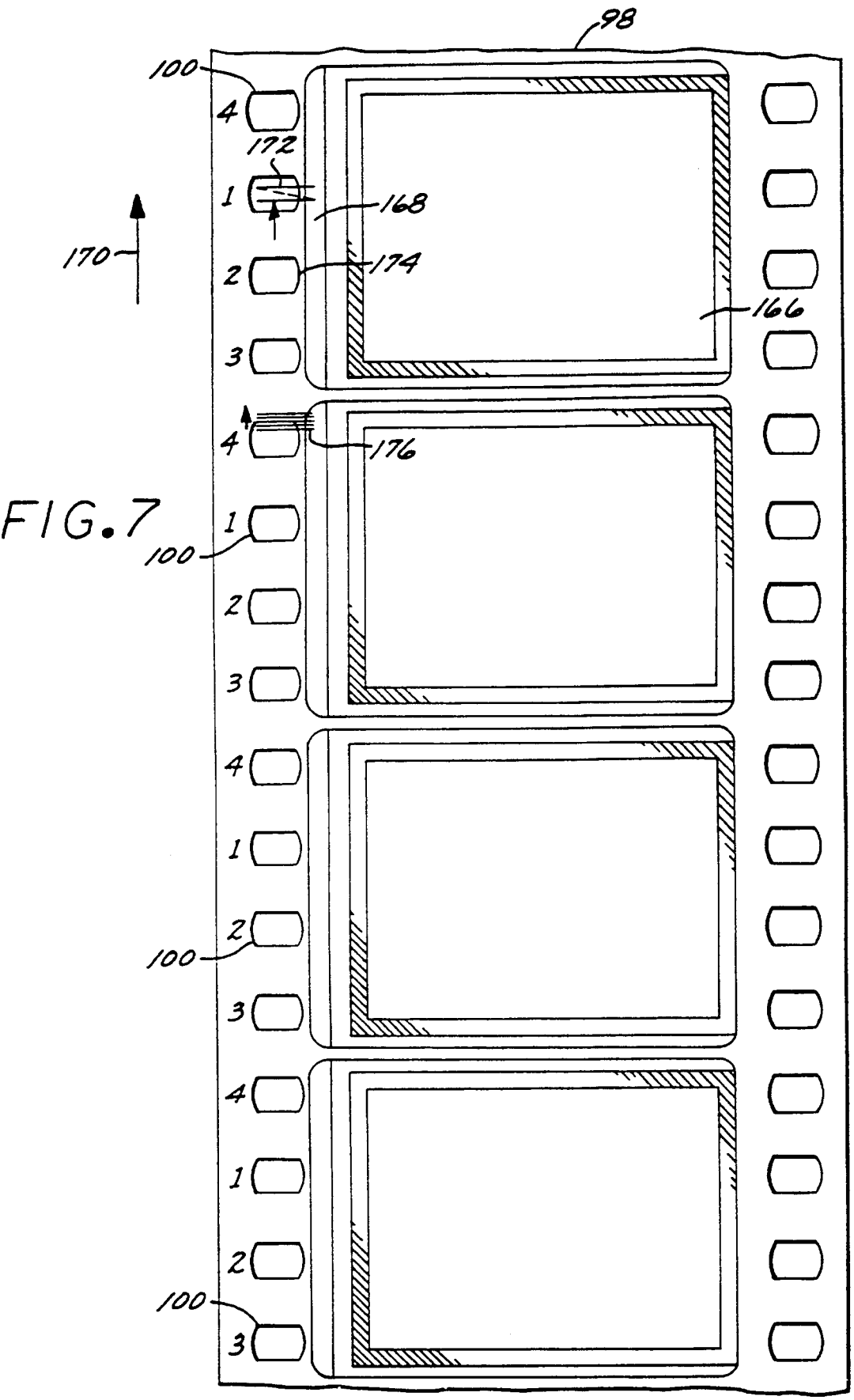
FIG. 7 shows a plan view of a portion of film to be scanned by a correction cathode ray tube and showing representative scan lines for scanning the sprocket holes.

In positioning the correction CRT on the bezel, the CRT is oriented by rotating the CRT and observing a video output signal derived from the correction scan processor 130 through the light guide 122. The light guide is coupled to the green input of the digiscan video processor and the output of the digiscan observed on a monitor. The correction CRT is moved closer or further away from the mirror 84 until the beam is focused on the film sprocket hole. The correction CRT is rotated about its central axis until the raster scans from left to right and from bottom to top; in other words, so that each line of the beam crosses the inside vertical edge of the sprocket hole from the interior of the sprocket hole to the film, as seen in FIG. 7 for the first, second, and third sprocket holes of the first frame. The center of the correction CRT is preferably placed relative to the sprocket so that the crest or highest point on a Bell & Howell or Cathedral sprocket hole of negative film is coincident with the centerpoint of the correction CRT, as focused by the Rank lens 88.

II. Film Scan Signals and Signal Processing

Figure 6:
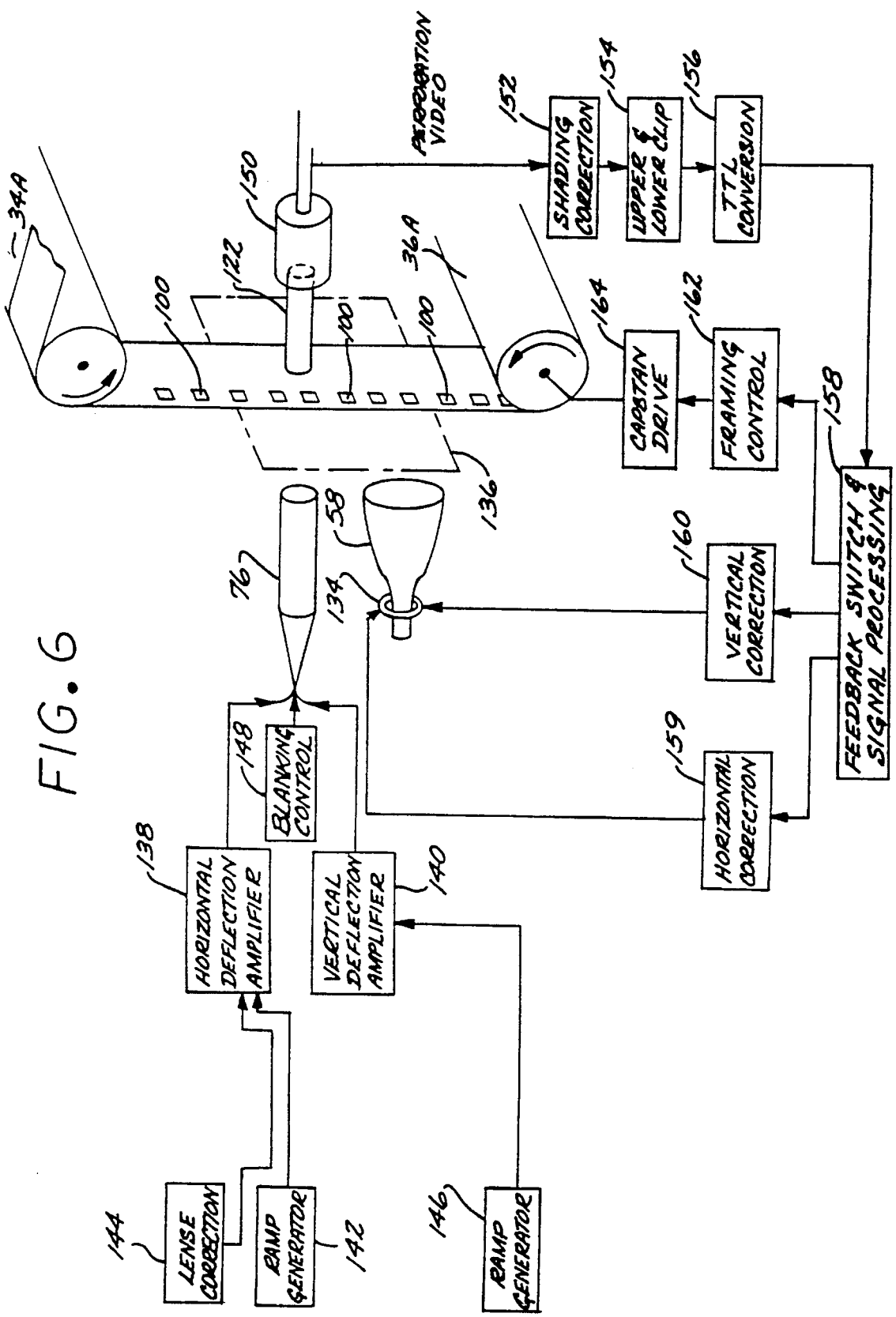
FIG. 6 is a schematic and block diagram of a telecine apparatus and signal processing apparatus.

FIG. 6 shows schematically the process carried out in the modified Rank Cintel apparatus. The Rank Cintel CRT 58 produces a flying spot scanning beam and is focused on the film plane 136 for exposing the picture information in the frame presented in front of the flying spot scanning beam. The Rank lens 88 (FIG. 2) focuses the beam onto the film plane so that the picture information from each frame can be obtained. The film is transported across the film plane by means of the supply reel 34A and the takeup reel 36A.

The correction CRT 76 is mounted on the same side of the film plane as the Rank Cintel CRT and provides a flying spot scanning beam which is focused by the Rank lens 88 (FIG. 2) onto the film plane. As discussed more fully below, the correction CRT is positioned to scan the sprocket holes 100 adjacent one edge of the film. It is to be understood that there are corresponding sprocket holes on the opposite side of the film shown in FIG. 6. The correction CRT produces a scanning beam which is controlled by a horizontal deflection amplifier 138 and a vertical deflection amplifier 140. The horizontal deflection amplifier is provided a signal from a horizontal ramp generator 142 and a lens correction circuit 144 for driving the horizontal sweep of the correction CRT according to a predetermined path. The horizontal signal produces a line sweep which scans the edge of the sprockethole under consideration in order to detect the edge of the sprocket hole. The horizontal sweep is made on a line-by-line basis as determined by the line drive of the Rank apparatus. The horizontal sweep is the same for each of the four sprockets of each frame on the film.

A lens correction signal is produced and applied to the ramp created by the ramp generator to correct for effects caused by passage of the correction CRT beam through the edge of the Rank lens 88. The lens correction effectively provides an offset to the horizontal sweep to offset the diffraction of the beam occurring at the edge of the lens, described more fully below.

The vertical deflection amplifier 140 is fed a signal from a vertical ramp generator 146. The ramp generator will be controlled according to the particular type of vertical sweep desired for the correction CRT for a given sprocket hole. In the preferred embodiment, where there are four sprocket holes per film frame, the preferred embodiment tests three sprocket holes to detect horizontal weave and tests a fourth sprocket hole to detect framing error and vertical weave for purposes of correcting those parameters for the next succeeding film frame. Two identical vertical sweep ramps are created in the ramp generator 146 for testing the first two of the three sprocket holes, a second vertical sweep ramp is created for testing the third sprocket hole, and third and fourth vertical sweep ramps are used for testing the fourth sprocket hole. In one form of the invention, each ramp can be produced by a separate ramp generator comprising, for example, a non-retriggerable one-shot, timer, buffer, and amplifier, as would be known to one skilled in the art. The settings can be adjusted for each ramp to provide the corresponding delay, offset and gain, et cetera, for the ramp. Alternatively, the plurality of ramps can be produced through software control, as described more fully below.

The correction CRT is also provided with signals from a blanking control circuit 148. The blanking control and protect circuit serves several functions. The circuit protects the correction CRT from damage due to loss of the Rank line drive, the Rank field drive, or the vertical or horizontal sweeps. The circuit also blanks the correction CRT between scans of each sprocket hole. Specifically, as one sprocket hole leaves the field of view of the aperture in the skid plate, and before the next subsequent sprocket hole adequately enters the field of view for scanning, the correction CRT is blanked to protect the correction CRT phosphor. Blanking in this instance can be carried out either by a series of timers or under software control, as described more fully below. Blanking is also carried out during horizontal retrace and vertical retrace of the correction CRT beam.

The light from the correction CRT beam is transmitted by the fiber optic light guide 122 and passed to a photomultiplier tube 150, having a pre-amp and high voltage supply, as would be known to one skilled in the art. The photomultiplier tube provides a high gain and low noise sensor for the focused line-scanning beam of the correction CRT.

The photomultiplier tube provides a voltage signal output which is a time-dependent voltage signal proportional to the light passing through the sprocket hole or adjacent film material and transmitted through the fiber optic light guide. The voltage signal is then processed through a shading correction circuit 152 to modify or adjust the voltage signal to further compensate for the effects of the curvature of the lens as seen by the correction CRT beam when passing through the Rank lens 88. This error or change is essentially constant for any given configuration of the Rank apparatus (though the error may change with film speed), and it therefore is possible to adjust for this variation.

The corrected voltage signal is then fed to an upper and lower clipping circuit 154 to clip the upper and lower extremes of the voltage signal. By way of example, during one horizontal scan of the correction CRT beam in the first sprocket hole of a given frame, the Rank CRT beam passes from the open sprocket area to the acetate film area of the film. While the correction CRT beam is in the sprocket area, the voltage output of the photomultiplier tube is relatively high. Conversely, when the correction CRT beam is in the film area, the voltage output of the photo-multiplier tube is lower. The transition or edge-crossing of the correction CRT beam from the sprocket hole to the film area produces an abrupt drop in voltage output from the high voltage to the lower voltage when the beam is in the film area. This drop in voltage represents the edge-crossing, and the point in time relative to the beginning of the horizontal scan at which the edge-crossing occurs represents the horizontal location of the edge of the sprocket hole. This also represents the relative horizontal location of the film.

Clipping of the upper and lower parts of the voltage signal from the photomultiplier tube effectively focuses the observance of the edge-crossing to a narrow band, preferably approximately half way between the upper and lower extremes of the voltage signal. The mid portion of the voltage drop representing the edge-crossing is the most efficient and accurate location at which to test the voltage change. This excludes any noise which results from diffraction or dispersion of the light beam at the edge of the sprocket hole and any other possible transient signal variations which may occur at the voltage extremes.

The falling edge of the voltage signal is then converted to a TTL signal in the TTL conversion circuit 156. The TTL output is fed to a feedback switch and signal processing circuit 158 for processing and then passed to either the horizontal correction circuit 159, the vertical correction circuit 160, or the framing control circuit 162, according to the particular sprocket hole being tested. The horizontal and vertical correction circuits 159 and 160, respectively, produce voltage sample ramps for producing a d.c. voltage and are coupled to respective coils in the horizontal and vertical error-correction coil mounted on the neck of the Rank CRT 58. The horizontal correction circuit 159 tests for horizontal error during scanning of the first three sprocket holes for a particular frame and holds the last horizontal error correction signal while the fourth sprocket hole is being scanned. The framing control circuit 162 is enabled during scanning of the leading edge of the fourth sprocket hole. The vertical correction circuit 160 is enabled during scanning of the leading edge of the fourth sprocket hole after the scan for framing control. The framing control 162 also produces a voltage sample ramp and is coupled to the capstan drive 164 of the Rank apparatus.

Before discussing the circuits designed to implement the apparatus and process described above, it should be noted that several circuit design concepts can be used. For example, for a frame scanning rate of 24 frames per second, analog components can be used to produce the horizontal sweep for the correction CRT, the vertical sweep for each of the scans of the four sprocket holes per frame, and for timing the sequence of events for each frame. As discussed above, each ramp can be generated by a one-shot and ramp generator, as would be obvious to one skilled in the art. The particular ramp produced would be determined by the actual settings for each ramp generator. Lens correction could be carried out by an additional ramp generator for creating a series of voltage signals in the shape of a semicircle. Shading correction for the voltage signal derived from the photomultiplier tube can be carried out by a waveform generator in a similar manner.

Each of the TTL signals produced by an edge-crossing for a given sprocket hole can be used to sample the respective voltage versus time ramp according to the time at which the edge-crossing occurs relative to the beginning of the horizontal sweep (sprocket holes 1–3) or the vertical sweep (sprocket hole 4). Each horizontal sweep and the corresponding sample ramp preferably start at approximately the same time relative to the field drive pulse. The vertical sweep for vertical error correction and the corresponding sample ramp preferably start at the same time, and the vertical sweep for framing error correction and the corresponding sample ramp preferably start at the same time. The sampling of the voltage ramp will then provide a d.c. voltage offset to the Rank CRT or to the capstan drive. There would be one sample ramp for horizontal correction, one sample ramp for vertical correction, and one sample ramp for framing control. Each of these ramps could be created by combination of a one-shot and a ramp generator, with the parameters for the voltage ramps adjusted by use of appropriate pots. The limitation on this type of circuit is that the analog components are subject to drift, and that the components are set only for one film frame rate, 24 frames per second. If the film is to be run at a different speed, an entirely separate circuit configuration must be created with appropriate electrical settings for the voltage ramps, et cetera, for each different speed to be used. For example, it may be desirable to run film at 30 frames per second or at 16 frames per second. This could not be done with the circuit set for a frame rate of 24 frames per second without adjusting the circuit values. Alternatively, the gain and offset for each waveform generator can be digitally controlled.

It is preferred to design the circuit such that the deflection ramps, sample ramps, and TTL processing signals can be created as a function of the desired film speed. This can be done by implementing the apparatus for software control wherein data for producing the various ramp and TTL processing signals can be stored in a memory device and accessed according to the particular film frame rate desired. For a given frame rate, the data is then output to a general purpose electronic circuit for producing the appropriate signals according to the data output. Such a software-controlled design will be described more fully below.

FIG. 7 shows a portion of the film strip 98 containing four frames of picture information 166, four sprocket holes per frame. There are four sprocket holes 100 on the left side of the film strip and four sprocket holes on the right side for each frame. The particular type of film shown in FIG. 7 is academy aperture type film and has an audio track 168 between the picture information and the sprocket holes on the left side of the film, as seen in FIG. 7. The direction of film motion is indicated by the arrow 170. Considering FIG. 7 in conjunction with FIG. 2, the audio track would be adjacent the rectangular opening 96 in the skid plate used for passing the correction CRT beam. The sprocket holes being scanned by the correction CRT beam are the sprocket holes on the left side of the film. Representations of several horizontal scan lines 172 from the correction CRT beam are indicated in the first and fourth sprocket holes on the film. Although horizontal scan lines are shown on more than one sprocket hole at a time, it is to be understood that the correction CRT beam scans only one sprocket hole at any given time, one horizontal trace or line at a time. Therefore, the scan lines shown in FIG. 7 are a partial representation of the scan lines used to scan the sprocket holes of the film. Assuming that the film is momentarily stationary on the skid plate and that the picture information of a frame is centered in the rectangular aperture 94 of the skid plate, the correction CRT window would be directly underneath the second sprocket hole indicated on the film. The numbers 1, 2, 3 and 4 shown on the film are not ordinarily present on film but are added for convenience of discussion.

The sprocket holes are numbered 1–4, where No. 1 corresponds to the second sprocket hole of each frame, No. 2 corresponds to the third sprocket hole of each frame, No. 3 corresponds to the fourth sprocket hole of each frame, and No. 4 corresponds to the first sprocket hole of the next succeeding frame. This numbering system is used because of the physical location of the correction CRT window on the skid plate, and the corresponding location of the rank CRT raster scan when the film frame is centered on the skid plate. The correction CRT window can be placed elsewhere along the skid plate as long as the timing for the scanning signals and the position of the correction CRT on the bezel are adjusted accordingly. However, it has been found that the location of the correction CRT window as described above are preferred. References to sprocket hole numbers will be according to the numbering system shown in FIG. 7.

As discussed above, the correction CRT can be adjusted by moving the CRT with respect to the bezel mount. The movement can be viewed by the operator by connecting the output of the photomultiplier tube to the digiscan and observing on a monitor the scan of a sprocket hole with the correction CRT. The correction CRT is rotated until the video representation of the sprocket hole is correctly oriented, or until each horizontal trace is essentially horizontal and crosses the crest or crown 174 of the sprocket hole halfway through the horizontal trace. The correction CRT is also moved closer to or further away from the 45° mirror to focus the horizontal trace in the film plane as determined by the sprocket hole. The correction CRT is also moved to place the center of the active phosphor area of the correction CRT at approximately the crest of the sprocket hole. Additionally, the entire horizontal trace from the beginning of the vertical sweep to the end of the vertical sweep is preferably centered in the correction CRT window.

During operation at a frame rate of 24 frames per second, it was found that scanning for horizontal and vertical weave in the film at a frequency of one sprocket hole per frame was insufficient because horizontal weave occurred to a noticeable extent even within the period of one scan of the picture information of one film frame, i.e. during 23.23 msec. Though 16 mm film has only one sprocket hole per frame, it is thought that with the smaller frames in the 16 mm film any horizontal weave occurring between each horizontal test would be unnoticeable. For 35 mm film operated at 24 frames per second, testing for horizontal weave is carried out on sprocket holes 1–3 of each frame.

Considering sprocket hole #1, a series of horizontal traces are produced for the first sprocket hole when it passes over the correction CRT window in the skid plate. At least one hundred horizontal scans is preferred in order to maximize the resolution of the scan. Each horizontal trace preferably scans the sprocket hole so that each trace crosses the edge of the sprocket hole at the crest or most extreme edge of the curved portion of the sprocket hole. In order to do this, the vertical rate of the horizontal lines, i.e., the rate at which the horizontal scan lines advance, is the same as the velocity of the film. Additionally, the horizontal trace preferably crosses the crest at approximately the center point of the horizontal trace.

The horizontal trace is detected by the photomultiplier tube at the end of the fiber optic light guide for producing a time dependent voltage output. When the horizontal trace is in the sprocket hole portion of the film, the voltage output is relatively high. As the beam from the horizontal trace crosses the edge of the sprocket hole at the crest, the beam is blocked or attenuated by the density of the acetate film. The intensity of the light detected by the photomultiplier tube decreases, and therefore, the voltage output of the photomultiplier also decreases. The exact nature of the attenuation will depend upon the type and format of the film being tested. For a negative film, the edge of the acetate forming the edge of the sprocket hole will be dark and the attenuation of the horizontal beam is greater than with a positive. The edge crossing signal can then be used to trigger a sample and hold for sampling the appropriate voltage sample ramp to determine an appropriate d.c. offset voltage to be applied to the horizontal correction coil of the horizontal and vertical correction coil 134.

As a result of the time required for passage of one sprocket hole across the correction CRT window and the time required to make a single horizontal trace with the correction CRT beam, a horizontal scan of the first sprocket hole can be made 180 times. Each time a horizontal trace is produced, an edge-crossing occurs, and a correction signal can be applied to the horizontal correction coil on the Rank CRT. As a result, the horizontal weave of the film can be detected and corrected 180 times in a matter of 8.55 milliseconds.

Therefore, with a proper vertical sweep, 180 horizontal lines can be applied to the first sprocket hole as the first sprocket hole passes across the correction CRT window. Two horizontal traces are shown in FIG. 7 in conjunction with the first sprocket hole of the first frame. The retrace is shown in dashed lines between the first or lower horizontal trace and the second or upper horizontal trace. The retrace is blanked, as would be known to one skilled in the art. The distance between adjacent horizontal traces will be determined by the vertical sweep and the length of the horizontal traces. It should be noted that for the preferred horizontal trace and vertical sweep where each horizontal trace crosses the crest of the sprocket hole, any framing error or vertical weave would have been corrected through the fourth sprocket hole, as discussed more fully below with respect to the fourth sprocket hole. Therefore, any error created by crossing of the horizontal trace at a point other than the crest of the sprocket hole is minimized.

Preferably, testing of the second and third sprocket holes for horizontal weave is carried out in an essentially identical fashion as that done with the first sprocket hole. Testing of the second and third sprocket holes for horizontal weave occurs while the Rank CRT is still scanning the picture information for the frame. Therefore, the horizontal scan of the crest of the second sprocket hole is conducted in a manner identical to that for the first sprocket hole. The length of the horizontal trace and the vertical sweep are identical. However, the horizontal scan of the third sprocket hole is cut short relative to those of the first and second sprocket holes since the Rank CRT finishes scanning the picture information at a point part way into the horizontal scanning of the third sprocket hole. Therefore, the horizontal scan of the crest of the third sprocket hole is essentially identical to those of the first and second sprocket holes, except that the scan is terminated earlier than for the first and second sprocket holes. As a result, the horizontal scan of the third sprocket hole includes 155 horizontal lines, or 155 tests of the relative position of the sprocket hole over a span of 7.38 milliseconds for a frame rate of 24 frames per second.

With the dimensions of the focused correction CRT beam and the correction CRT window in the skid plate, a delay occurs during the movement of one sprocket hole out of the correction window prior to sufficient entry of the next sprocket hole into the window so that the crest of the sprocket hole can be tested during horizontal weave scanning. During those times, the last correction signal applied to the horizontal and vertical correction coil 134 is maintained until a new horizontal correction signal is generated from scanning of the next succeeding sprocket hole. When scanning of the third sprocket hole is complete, the horizontal correction signal applied to the horizontal correction coil is maintained until the next horizontal test is made with the first sprocket hole in the next succeeding frame. Additionally, horizontal testing of the first sprocket hole in the next succeeding frame begins just slightly before the Rank CRT begins scanning the picture information. Therefore, the horizontal position of the next succeeding frame is updated before any significant amount of picture information is scanned by the Rank CRT.

The fourth sprocket hole for each frame is used to test for error in and provide correction signals for adjusting the framing of the film and to adjust the vertical position of the film. The net effect of each adjustment is to correct for vertical weave. The correction for framing addresses slow vertical drift of the film resulting from inherent drift of the servo mechanism of the Rank apparatus and from changes in loading on the film as the mass of the film gradually transfers from one roll to the other. The correction signal is applied to the Rank servo system to compensate for the drift. The vertical correction adjusts for vertical weave which is more transient or short term than vertical weave due to framing error. The vertical correction signal is applied to the Rank CRT to move the Rank raster an amount corresponding to the vertical weave of the film frame that still exist after adjustment for framing error. It should be noted that correction for framing error due to drift in the Rank servo mechanism is important since significant or continuous vertical drift due to the servo mechanism could cause the sprocket holes to go out of the correction window in the skid plate even though the picture information in the film frame is still within the aperture of the skid plate. If vertical weave is allowed to continue beyond a certain point, correction for the vertical weave by adjustment of the Rank raster can still be done except that the sprocket holes are no longer in the correct position in the correction CRT window at the times when the correction CRT beam scans the window.

Scanning for vertical weave and framing error is done by testing the location of the leading horizontal edge of the fourth sprocket hole. For example, testing for framing error can be made by testing the position of the leading edge of the fourth sprocket hole relative to a predetermined reference point, i.e., the Rank frame drive. The leading edge of the fourth sprocket hole is used to test for framing error by noting the time required for a horizontal line trace 176 to cross the edge. Framing error is determined by scanning 134 times and noting the time required for one of the horizontal traces to cross the leading edge. With the particular vertical sweep used for framing control at 24 frames per second, only one line crossing will occur during the 134 lines. The particular point in time at which the line crossing occurs is used to determine the framing error and provide an appropriate correction signal to the Rank servo. The vertical and horizontal sweeps for the correction CRT are preferably such that no correction is required if the line crossing occurs with the 67th (one-half of 134) line of the 134 horizontal traces being made for the framing control. Additionally, the vertical and horizontal sweeps for framing correction are such that the first group of the horizontal traces scans the portion of the film above the fourth sprocket hole, and the second group of the horizontal traces scans the top portion of the sprocket hole. It should be noted that framing correction need only be tested and applied once per frame.

Testing and correction for vertical-weave is also done by scanning the leading edge of the fourth sprocket hole. Scanning is done in a manner similar to that done for framing except that where the vertical rate of the framing scan was slower than the film velocity, the vertical rate for vertical error scanning is slightly faster. The correction CRT beam is adjusted a certain amount after completion of the framing scan so that the correction CRT beam can scan the fourth sprocket hole at a vertical sweep rate just slightly faster than the linear speed of the sprocket hole. This effectively increases the resolution with which the leading edge of the sprocket hole is scanned. The spacings between horizontal traces for the vertical correction are further apart than the horizontal traces for framing correction because of the vertical speed of the horizontal traces for vertical correction.

Scanning of the leading edge of the fourth sprocket hole for vertical weave is similar to scanning for framing error in that the relative location of the horizontal edge of the fourth sprocket hole is indicated by a single edge-crossing of one horizontal trace. However, the first group of the horizontal lines scans the upper portion of the sprocket hole, and the second group of the horizontal lines scans the portion of the film above the leading edge of the fourth sprocket hole. 137 horizontal lines are used to scan the leading edge of the fourth sprocket hole at 24 frames per second and, given the horizontal and vertical sweep, set for the vertical weave detection. Assuming any framing error has been corrected or is in the process of being corrected, the edge-crossing of the horizontal trace for the leading edge of the fourth sprocket hole will occur at or near the 68th or 69th horizontal trace (one-half of 137). It is considered adequate to correct the vertical error on a basis of once per frame, since any vertical weave occurring between two adjacent corrections for vertical weave is not particularly noticeable.

This, in effect, causes the correction CRT beam to zoom in on the leading edge of the fourth sprocket hole, thereby increasing the resolution with which the test for vertical weave is made.

The most convenient clock or sequence control parameter is the line drive pulse created by the Rank apparatus. The line drive pulse is a negative-going pulse produced from a clock signal in the Rank apparatus. The line drive pulse is related to the frame rate in that both are derived from the high speed clock in the Rank apparatus. The line drive pulse initiates each horizontal trace of the Rank CRT for scanning the picture information in each frame. The frequency of the line drive for film systems is 21 kHz. For a frame rate of 24 frames per second and a line drive frequency of 21 kHz, or one line every 47.68 microseconds, the Rank apparatus produces a line drive pulse 875 times per frame, thereby horizontally scanning the picture information a maximum of 875 times. However, blanking typically occurs near the bottom of the film frame to exclude an unusable portion of the picture information. Using the line drive signal as a control signal, the correction CRT can also scan the film a maximum of 875 times per frame. Starting at the beginning of any given frame, a first block of the 875 lines can be used to scan the first sprocket hole, a second block can be used to scan the second sprocket hole, et cetera. The selection of the sequence of lines into groups is depicted in FIG. 8B, showing the bipolar vertical sweep ramps applied to the correction CRT as a function of time for a given frame.

Figure 8:
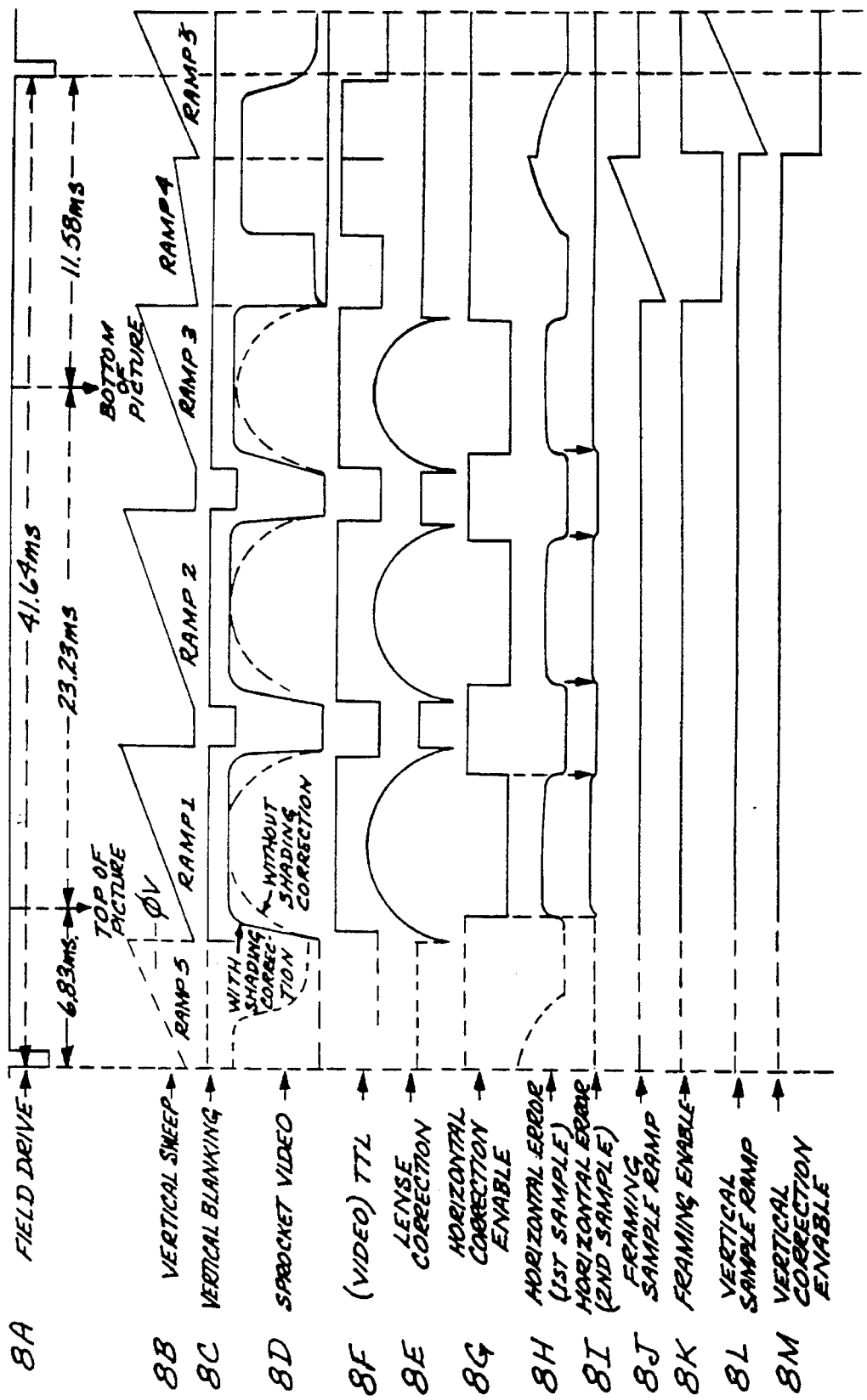
FIGS. 8A–8M show several curves which are produced during operation of the apparatus during passage of a single frame through the skid plate.

By way of background, FIG. 8B is shown in conjunction with the field drive pulse shown in FIG. 8A. The field drive pulse is a negative-going pulse from the Rank apparatus and is produced at the beginning of each frame. For a film frame rate of 24 frames per second, the frequency of the field drive pulses is 24 per second. (It will be assumed for purposes of discussion that the film frame rate is 24 frames per second. Suitable modifications can be made in the various parameters to accommodate other film frame rates, as would be known to one skilled in the art in view of the description herein.) The duration between field drive pulses is 41.64 milliseconds. As indicated in FIG. 8A, the picture information begins 6.83 milliseconds after the field drive pulse and lasts for 23.23 milliseconds. The remaining 11.58 milliseconds between the field drive pulses does not contain any usable picture information.

The field drive pulse is not only a timing signal for scanning of each frame, but it is also a clock pulse to be compared with an output signal from the tachometer sprocket 40 (FIG. 1). This is how framing is corrected on a typical Rank Cintele apparatus. The tachometer sprocket is dimensioned so that a pulse is produced at the beginning of each film frame when the red dot on the tachometer sprocket is aligned with the beginning of a frame on the film. When the sprocket is so aligned, a film frame is positioned in the film gate, and the Rank CRT raster is positioned for scanning the same film frame such that the film frame is centered in the gate and the Rank raster scan is centered in the film frame. If the two pulses are not simultaneous, the Rank servo system is adjusted to correct for the framing error. However, in the preferred embodiment, the Rank framing servo is no longer controlled exclusively by the tachometer sprocket, but is controlled by the tachometer sprocket in parallel with the framing error correction signal developed during the correction CRT scan of the fourth sprocket hole. Therefore, if both signals indicate a framing error of the same magnitude and direction, the framing will be corrected only by an amount corresponding to the magnitude. Additionally, the switch on the Rank control panel corresponding to framing adjustment is disconnected from the Rank servo and connected to the Rank d.c. vertical sweep offset.

The first complete ramp in FIG. 8B, identified as ramp 1, scans the first sprocket hole during the time that the crest of the first sprocket hole is in the correction CRT window. Ramp 1 is used to test for horizontal weave. As indicated with reference to FIGS. 8A and 8B, ramp 1 begins before the top of the picture is scanned so that horizontal correction can be accomplished before, or at the same times as, the top of the picture is scanned. Ramp 2 is timed and set so that the correction CRT scans the crest of the second sprocket hole when the crest is in the correction CRT window. Ramp 3 is similarly timed and set to scan the third sprocket hole. Ramps 4 and 5 are timed and set to scan the leading horizontal edge, one ramp after the other, of the fourth sprocket hole for framing and vertical correction.

The timing and settings for creating the individual vertical sweep ramps can be determined for a given film rate by coupling the output of the photomultiplier tube to an oscilloscope to which is also coupled the field drive. The oscilloscope displays the time dependent voltage output of the photomultiplier tube. The field drive can be displayed on the oscilloscope to define the boundaries of the film frame. Then using field drive as time zero and five ramp generators, the duration of the scan between field drive pulses can be divided up among the five ramps as necessary. Ramps 1–3 will be allocated to sprocket holes 1–3, respectively, and ramps 4 and 5 will be allocated to sprocket hole 4. Since there are four sprocket holes per frame for 35 mm film, ramp 1 occurs during the first block of approximately 10 msec, ramp 2 to the second, ramp 3 to the third and ramps 4 and 5 to the fourth. Therefore each ramp initially will be timed accordingly.

The precise positioning of ramps 1–3 then can be made by applying the correction voltage output of the first sample and hold in the horizontal correction circuit (described below) to the oscilloscope. For ramps 1–3, it is preferred to scan the crest or vertical center of the first, second and third sprocket holes, respectively, as the sprocket holes move through the correction CRT window. Preferably, the scan begins as soon as the crest enters the portion of the correction CRT window scanned by the correction CRT and ends where it leaves. The oscilloscope would then show a voltage versus time signal that is straight if the vertical sweeps for the three sprocket holes are such that the horizontal traces follow the crest throughout each of the first scans. See FIG. 8D. If the image shows a downwardly parabolic curve, then either the scan is started too early or too late, or the gain for the vertical sweep ramp is too high. One or more of these parameters is adjusted so that the displayed curve becomes as straight as possible. Any remaining curvature after finding the center of the sprocket hole probably indicates error due to optical effects as the scanning beam is transmitted from the correction CRT to the photomultiplier tube. Correction for this error is discussed below.

The same steps can be followed while viewing a monitor displaying an image of the sprocket hole derived from the output of the photomultiplier tube being fed one input of the digiscan. If the vertical image of the edge of the sprocket hole is straight, then each of the horizontal scans crosses the same point on the sprocket hole. The crest is found by adjusting the timing or offset of the amplifier coupled to the correction CRT coil so that the image of the open space of the sprocket hole increases in size.

Once the ramp generators are set, the voltage signals represented by the ramps can be digitized and stored in appropriate memory devices for use with an appropriate driving circuit, described more fully below. Once all of the ramp generators are configured as desired, the stored digital data can be used to reproduce the vertical sweep ramps for testing the digital data. The process can be repeated and adjustments made to the timing and settings of the ramp generators until satisfactory signals are produced with the digital data.

The horizontal sweep ramp generator is adjusted in a similar manner. The offset is adjusted to place the crest of the sprocket hole at the middle of the sweep. The gain is adjusted to expand the length of the horizontal sweep to produce an edge crossing signal even with a large horizontal weave in one direction or the other. Furthermore, the length of the horizontal trace must be sufficient to scan the horizontal edges of the sprocket hole for framing error and vertical error.

Defining ramps for vertical and framing error correction occurs in a similar manner. The voltage output of the photomultiplier tube is applied to the oscilloscope to show the voltage output of the photomultiplier tube as a function of time. Time for each of the vertical sweeps in the fourth sprocket hole is allocated according to the resolution necessary for each scan. In the preferred embodiment, the scan for the framing error correction has at least one hundred lines and for the vertical correction signal the number of horizontal scan lines which produce an edge crossing signal is maximized. The vertical sweep for the vertical error correction will be described first since the timing and gain for ramp 4 is dependent to a certain extent on the timing and gain for ramp 5. However, it should be noted that ramp 5 is used for vertical error correction after a framing error correction signal has been applied to the rank servo as a result of the information obtained from the framing error correction signal produced through ramp 4.

The horizontal scans produced through ramp 5 are intended to scan the leading edge of the fourth sprocket hole as closely as possible but slightly faster than the linear speed of the leading edge. This is done to provide high resolution during scanning of the leading edge. So that as many vertical error correction signals as possible can be produced during the scanning of the fourth sprocket hole. The ramp generator from ramp five is configured to begin the sweep at approximately the midpoint of time during which the fourth sprocket hole is within the correction CRT window. At first the gain of the ramp generator is set so that the rate of movement of horizontal lines with respect to each other is greater than the linear movement of the leading edge of the sprocket hole. The gain is then adjusted to slow the advance of the horizontal lines until such time as the vertical rate of the horizontal line approaches the linear rate of the film. Initially, the voltage output shown on the oscilloscope will show a high plateau leading to a sharp dropoff indicating an edge crossing, and a low voltage output scanning the film material. The high voltage plateau indicates scanning of the sprocket hole. As the gain is adjusted to increase the vertical rate of the horizontal lines, the voltage dropoff becomes more gradual. If the adjustment continues in the same direction, the low voltage portion of the voltage output will gradually increase. This indicates that the optimum setting for the vertical sweep ramp five has been passed. Therefore, the gain is adjusted in the opposite direction until the voltage output appears similar to that corresponding to ramp 5 in FIG. 8D where the vertical rate of the horizontal scan lines is slightly faster than the linear speed of the sprocket hole. If more horizontal scan lines are desired for use with respect to vertical error Manning of the leading edge, the scan can be started earlier in time. However, it is preferred to have approximately one hundred horizontal lines for the framing error can of the leading edge of the fourth sprocket hole in conjunction with the vertical sweep ramp 4. At these settings, the possibility of the film jumping around as a result of poor scan resolution is minimized. Setting of a ramp generator for the framing error correction scan of the leading edge of the fourth sprocket hole is done in a similar fashion. Since the framing error correction signal is coupled to the servo and because the correction for framing error is more gradual, the resolution desirable for the vertical error correction scan is not necessary with respect to the framing error correction scan.

Once the vertical sweep ramps are determined, the voltages represented by ramps 1–5 in FIG. 8B are digitized and stored in appropriate memory devices as described more fully below. The digital data is then tested with an appropriate circuit (also described more fully below). If the ramps need to be changed, one or more of the ramp generators are readjusted and the resulting ramps digitized. This process was repeated until the desired signals are produced. This process can be carried out for any film frame rate desired.

If the output has a rising edge, the edge represents the entry of the sprocket hole into the correction CRT window and a falling edge represents the exit from the window. While the sprocket hole is in the window, a maximum voltage output over a straight line indicates scanning of the crest of the sprocket hole at the same vertical rate as the linear speed of the sprocket hole. For the present configuration of the correction CRT and the correction CRT window, the first scan of the crest of the first sprocket hole will occur approximately 5 milliseconds after the field drive pulse. The 5-millisecond delay after field drive can be provided by a timer, one-shot, etc. The slope and duration of the ramp is then determined as would be known to one skilled in the art.

The first sprocket hole is scanned for a period determined by the duration of ramp 1, which is 8.55 milliseconds, or 180 horizontal scan lines. The number of lines in an interval can be determined by dividing the horizontal scan duration into the time of the interval. The horizontal scan duration is the same as that for the Rank line drive. Similar steps can then be carried out for the remaining ramps.

Figure 9:
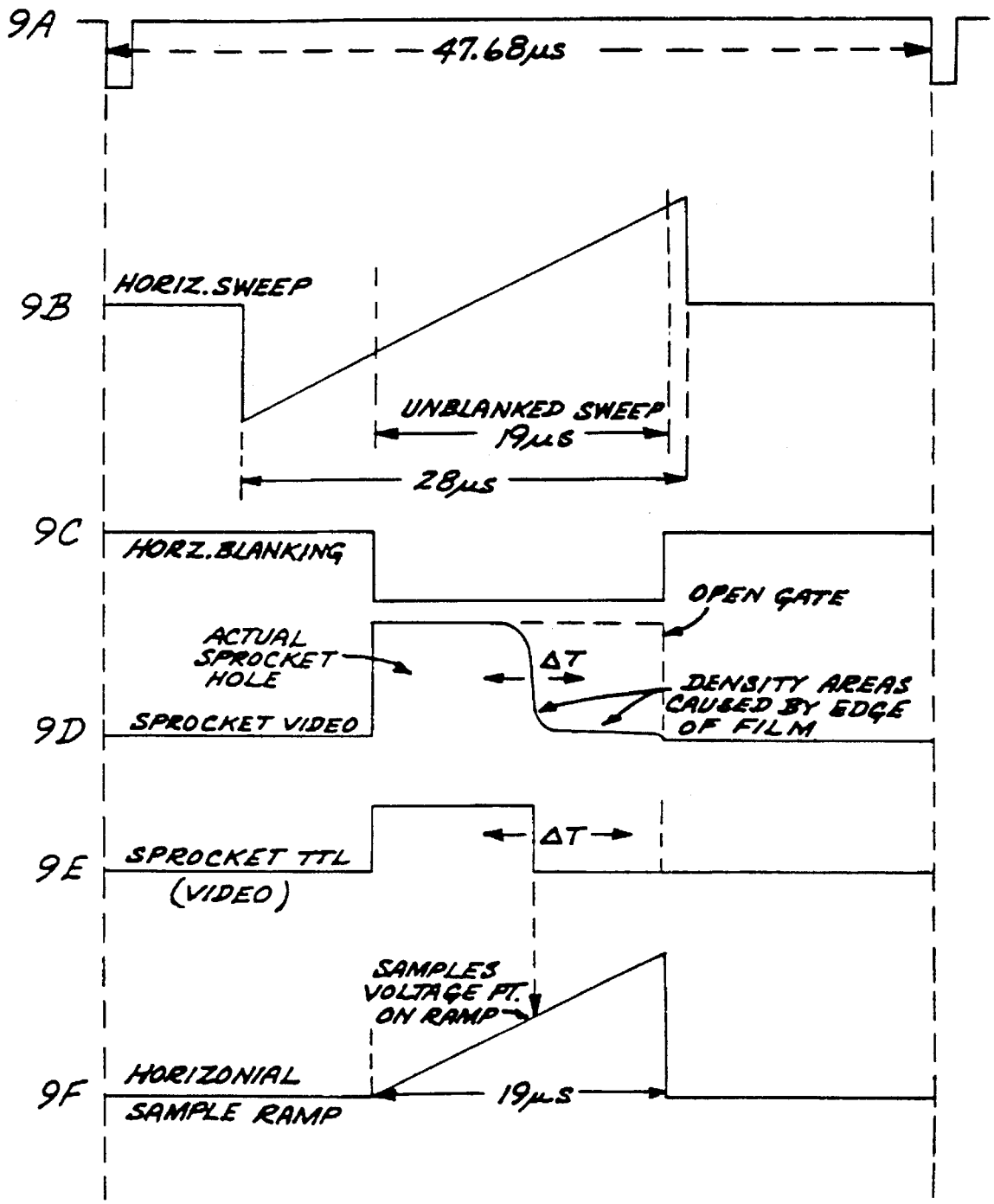
FIGS. 9A–9F show several representative curves occurring during the time span over which one horizontal sweep goes across the correction cathode ray tube.

The correction CRT is blanked for a period of 1.8 milliseconds, or 39 lines, before scanning of the second sprocket hole begins. The second sprocket hole is then scanned for the same amount of time as for the first sprocket hole, and the correction CRT then blanked again. The third sprocket hole is scanned for the duration of ramp 3, which is 7.38 milliseconds, or 155 lines. Scanning of the third sprocket hole is terminated sooner than for the first and second sprocket holes, since the picture information is no longer being scanned, and horizontal correction is no longer needed for the present frame. The bottom of the fourth sprocket hole is scanned for a period of 6.36 milliseconds, or 134 lines, for framing correction, and the top of the fourth sprocket hole is scanned for a period of 6.5 milliseconds, or 137 lines for vertical weave correction. It will be noted that the fifth ramp extends past the next succeeding field drive pulse for the same amount of time as the delay for the start of ramp 1. The horizontal trace of the correction CRT is driven by the line drive and, therefore, produces a horizontal trace every 47.68 microseconds. Two negative-going line drive pulses are shown in FIG. 9A, and the horizontal sweep for the correction CRT is shown in FIG. 9B. The horizontal sweep is bipolar, beginning with a negative voltage, passing through zero volts and finishing at a positive voltage. The entire horizontal sweep is not used to create a scanning beam, as indicated in FIG. 9B. An unblanked portion having a duration of 19 microseconds is used to produce a usable beam. A blanking period of approximately 8 microseconds occurs at the beginning of the horizontal sweep to enable the horizontal trace to stabilize following the line drive pulse. At the end of the horizontal sweep ramp, the voltage returns to zero until the beginning of the next horizontal sweep ramp following the next line drive.

FIG. 9C shows the horizontal blanking signal applied to the correction CRT, a high signal causing blanking of the correction CRT.

FIG. 9D shows a voltage versus time curve representing the output of the photomultiplier tube during scans of the first three sprocket holes. After the line drive pulse, the voltage output is essentially zero due to the blanking of the correction CRT. As soon as the blanking is removed, the voltage output of the photomultiplier tube increases, indicating that light is passing through the sprocket hole to the prism and fiber optic light guide. The horizontal trace continues toward the edge of the sprocket hole until such time as the beam crosses the crest of the sprocket hole. At the edge-crossing, the intensity of the beam, and therefore the voltage of the photomultiplier, decreases as a result of the density areas of the film. The particular location with respect to the time elapsed from the line drive pulse of the falling edge of the voltage signal will indicate the location of the edge of the sprocket hole relative to the center of the correction CRT, i.e., the center of the horizontal trace. If the falling edge occurs too soon with respect to the line drive pulse, then the sprocket hole edge, and therefore the film, has weaved to the left, when the film is as shown in FIG. 7. If the falling edge of the voltage signal occurs too late, the edge of the sprocket hole, and therefore the film, has moved to the right. This information is used to provide a correction signal to the Rank CRT raster to adjust for the horizontal weave. The correction signal is provided for every horizontal trace, i.e., every 47.68 microseconds.

For any given sprocket hole, a series of voltage signals will be produced and used to indicate the relative position of the edge of the sprocket hole. For the first two sprocket holes, 180 horizontal traces are made to detect the position of the edge of the sprocket hole. These 180 lines are shown in composite form in FIG. 8D as the sprocket video corresponding to ramp 1, the first sprocket hole. The curve represents the peak voltage signal of each line when the beam passes through the sprocket hole. The falling edges and the balance of the voltage signal before and after the unblanked sweep are omitted from the sprocket video curve of FIG. 8D, but it is to be understood that each horizontal line produces a sprocket video signal from the photomultiplier tube similar to that shown in FIG. 9D. However, the peak value of any one voltage signal will depend on the physical location of the horizontal scan line, e.g., near the edge of the Rank lens or correction CRT window, or near the center. The same comments apply for the third sprocket video signal shown in FIG. 8D, except that the signal contains 155 lines.

For the sprocket video voltage signal corresponding to ramp 4, the peak voltage output from the photomultiplier tube is low until such time as one of the horizontal traces enters the sprocket hole. Upon entering the sprocket hole, the peak voltage signal increases due to the increased light passed through the sprocket hole and transmitted by the fiber optic light guide. There are 135 lines used during the framing testing of the leading edge of the fourth sprocket hole, but there is typically only one edge-crossing. As discussed above, the first portion of the 135 lines scan the film material between the third and fourth sprocket holes, while the second portion scans the fourth sprocket hole.

The opposite occurs for the sprocket video voltage signal corresponding to ramp 5. During this segment, 137 lines are used to detect the location of the leading edge of the fourth sprocket hole immediately before the scan for the next film frame begins. Before the leading edge occurs, the peak voltage output is high since the correction CRT retraces slightly and the horizontal traces-pass through the sprocket hole. As soon as the edge of the sprocket hole is passed, the peak voltage decreases due to attenuation by the film. It is to be understood that the last half of each horizontal trace still crosses the vertical edge of the fourth sprocket hole. This occurs because the horizontal offset of the correction CRT is not changed in going from the third sprocket hole to the fourth sprocket hole. The length of the horizontal trace is such that such a change is not necessary in order to adequately scan the horizontal edges of the fourth sprocket hole. Therefore, the sprocket video shown in FIG. 8D corresponding to ramps 4 and 5 represents a composite of the peak voltage signals obtained from the photomultiplier tube.

III. Hardware and Data for Producing

Scans and for Signal Processing

Figure 10:
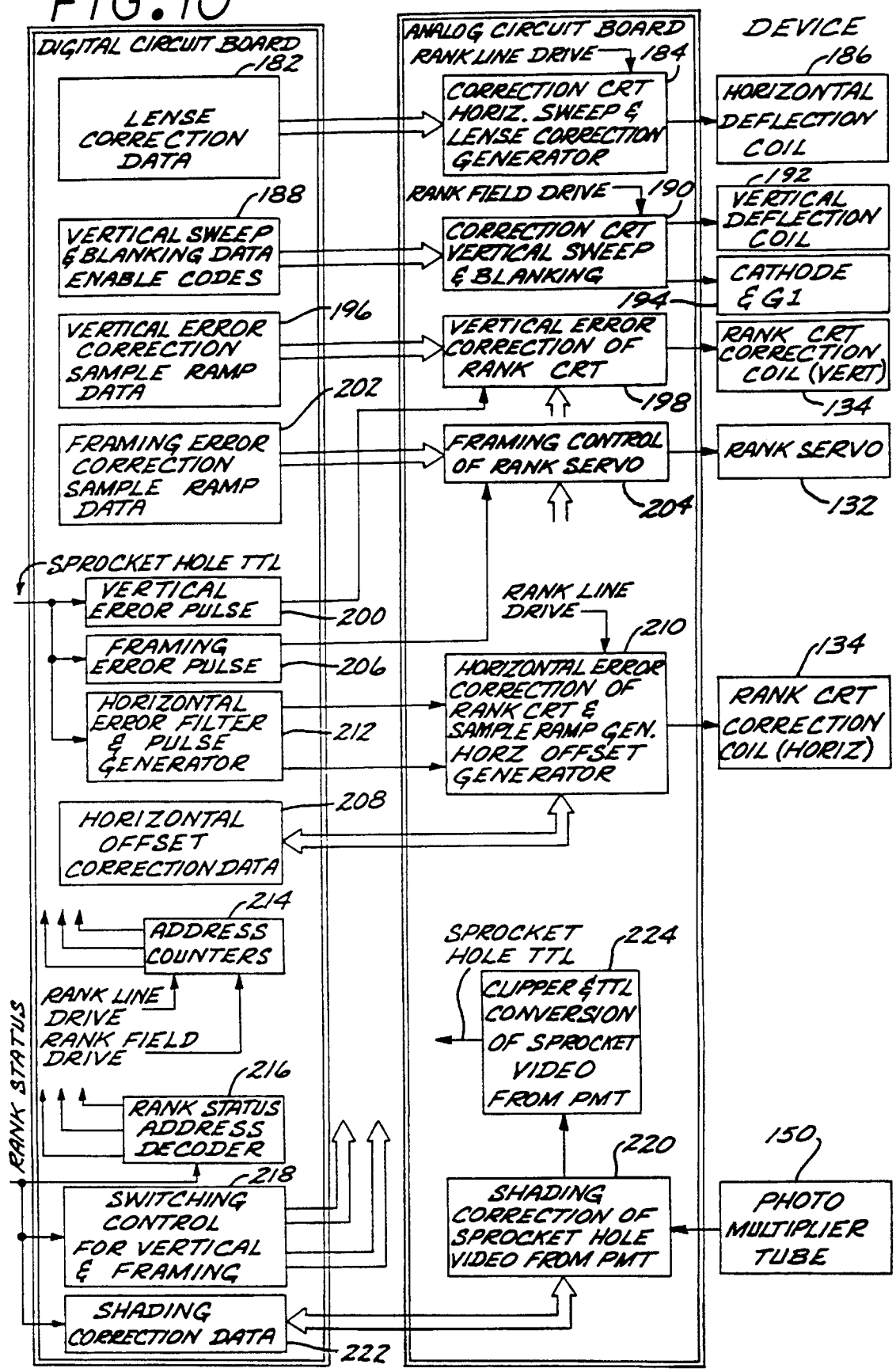
FIG. 10 is a schematic and block diagram indicating the relationship between a digital circuit board and an analog circuit board used for controlling a plurality of devices in the apparatus.
Figure 11A:
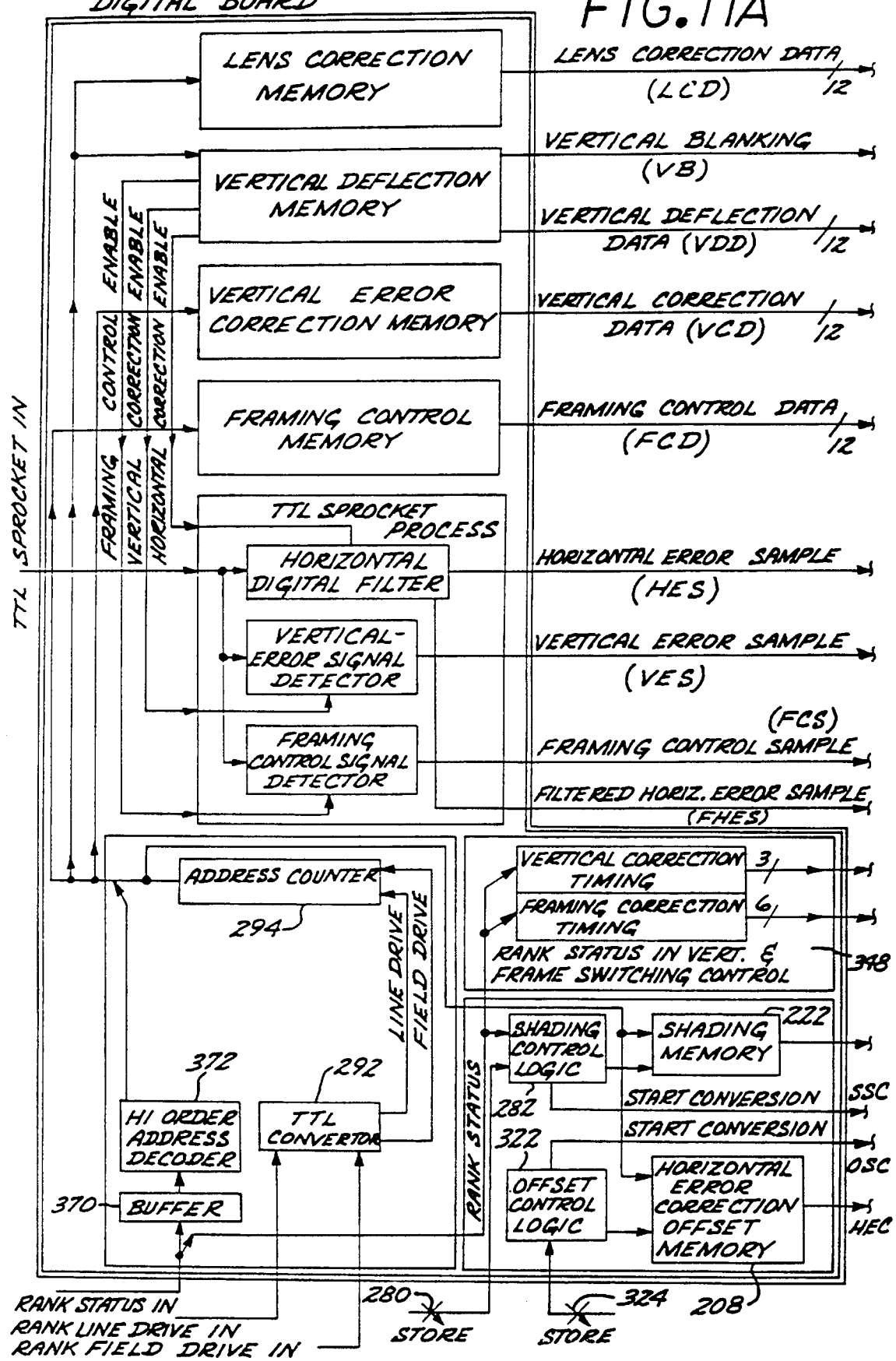
FIGS. 11A and 11B are more detailed schematic and block diagrams indicating the relationship between the digital circuit board, the analog circuit board, and various hardware on the apparatus.
Figure 11B:
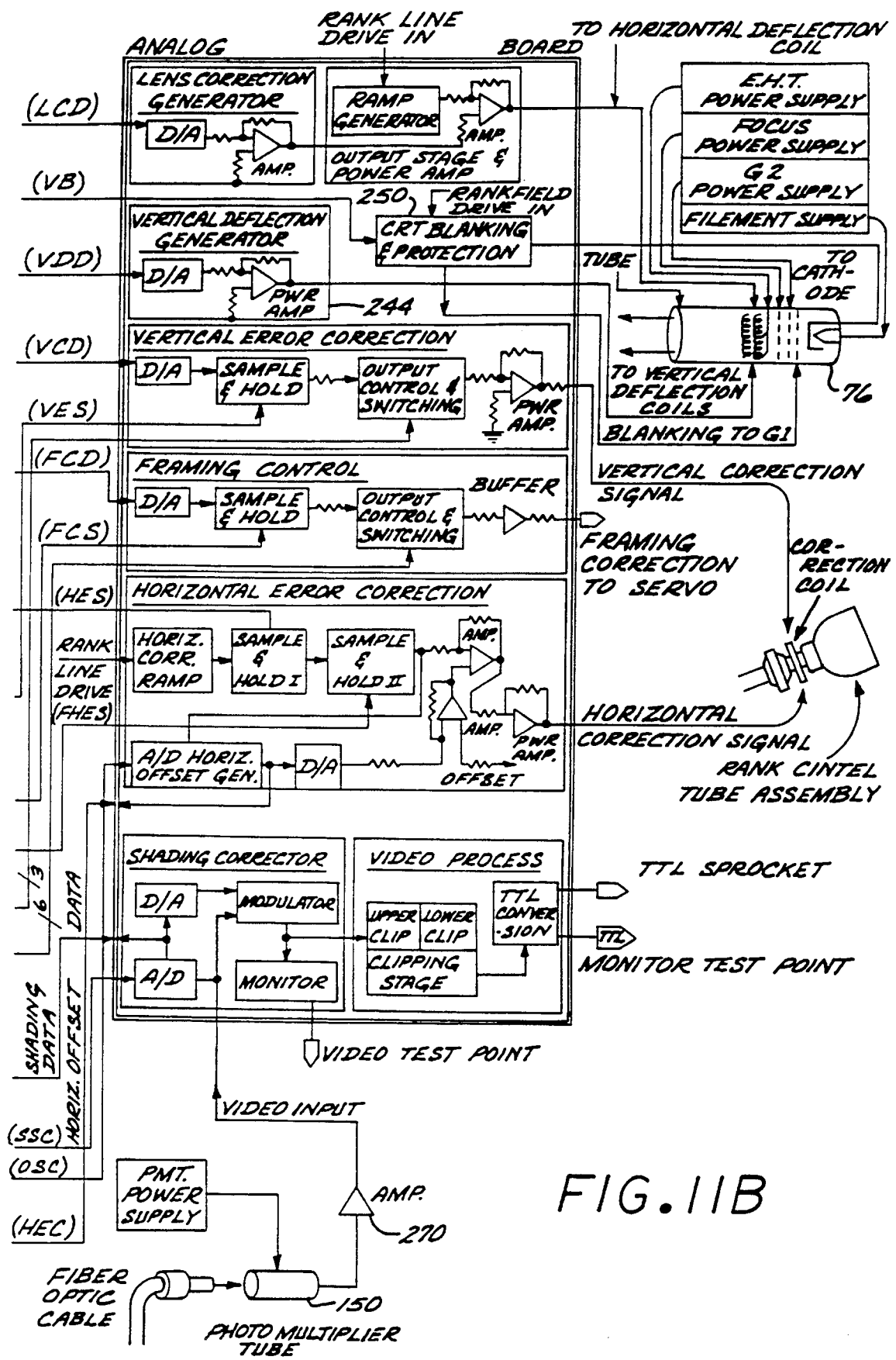

FIGS. 10 and 11 show basic and detailed, respectively, schematic and block diagrams of a preferred design of the apparatus for carrying out horizontal, vertical, and framing correction. Considering FIG. 10 first, a distal circuit board 178 includes several data storage devices, logic components, and address counters. The digital board interfaces with an analog circuit board 180 having various circuit elements for accepting input from or controlling a plurality of discrete devices.

The digital board includes a lens correction data storage device 182 for providing data over a data bus for adding an offset to the signal produced in the horizontal sweep generator 184 on the analog circuit board. The resulting signal controls the horizontal deflection coil 186 of the correction CRT. No correction data is applied to the signal for the fourth sprocket hole. The lens correction adjusts each horizontal sweep to counteract the effect of the correction CRT beam passing through the Rank lens near its edge.

A second data storage device 188 stores data for the vertical sweep and blanking of the correction CRT. The data is passed over a data bus to the vertical sweep and blanking circuit 190 on the analog circuit board for controlling the vertical deflection coil 192 and the cathode and G1 circuit 194 of the correction CRT. The second data storage device also stores ENABLE codes used to control other devices on the digital board.

A third storage device 196 contains vertical error correction sample ramp data for use by the vertical error correction circuit 198 on the analog board. The sample ramp is a bipolar voltage versus time ramp which is sampled at the time of an edge-crossing occurring during scanning of the leading edge of the fourth sprocket hole. The sampled voltage provides a d.c. offset voltage to the Rank CRT correction coil 134. Sampling of the sample ramp occurs upon receipt of a vertical error pulse from a vertical error signal detector 200, which in turn receives the edge-crossing signal as a sprocket hole TTL signal.

A fourth storage device 202 contains sample ramp data for framing error correction. The data is fed on a data bus to the framing error control circuit 204 on the analog circuit board, which in turn controls the Rank servo 132. The sample ramp for framing error correction is sampled by the framing control circuit upon receipt of a framing error pulse from the framing control signal detector 206. The framing error pulse is produced upon receipt of a sprocket hole TTL signal representing an edge-crossing of the leading edge of the fourth sprocket hole in each frame.

A fifth storage device 208 such as an 8-bit wide 2K static ram stores horizontal offset correction data to be accessed over a data bus by a horizontal offset generator and horizontal error-correction circuit 210. The horizontal error-correction circuit 210 on the analog board controls the Rank CRT correction coil 134. The correction circuit 210 includes a sample ramp generator sampled upon receipt of a sprocket hole TTL signal representing the negative-going voltage signal from the photomultiplier tube during each scan of the first, second, and third sprocket holes. The signal comes from the horizontal error filter and pulse generator circuit 212 on the digital board. The horizontal error filter effectively ignores horizontal line scans of the first, second, or third sprocket holes which produce edge-crossing signals more than once within adjacent line drive signals. The digital board also includes address counters 214 clocked by TTL Rank line drive signals and reset by TTL Rank field drive signals. The address counters provide output to the memory devices 182, 188, 196, and 202 for accessing the data therein at appropriate times determined by the address code from the counters 214 and by the ENABLE codes in the storage device 188.

A Rank status address decoder 216 takes information regarding the status of the Rank apparatus and decedes the signals to provide address signals to various devices on the digital board. The Rank status is also input to the switching control 218 for controlling the vertical and framing correction during times such as starting of the film. The switching control circuit controls the vertical error correction and framing control circuits 198 and 204, respectively.

Other information external to the digital and analog boards and input to the analog circuit board includes voltage signals representing sprocket hole video signals from the photomultiplier tube 150 which supplies a signal to a shading correction circuit 220. The shading correction circuit is coupled to a data storage device 222 such as an 8-bit wide ram through a bidirectional data bus for storing and retrieving shading correction data to be applied to the sprocket hole video signal from the photomultiplier tube. The video signal is passed to a clipper and TTL conversion circuit 224, which provides a sprocket hole TTL signal to the pulse circuits 200, 206, and 212 on the digital circuit board.

The circuits will now be described in more detail with respect to FIGS. 11–21. Specifically, the analog circuit board includes a circuit such as that shown in FIG. 12 for producing the horizontal sweep-shown in FIG. 9B. The ramp generator circuit includes line drive input to a TTL conversion transistor for applying a signal to a one-shot 226. The one-shot provides a negative-going pulse to the ramp generator 228 for producing the horizontal sweep signal, as shown in FIG. 9B. The ramp is input to a horizontal gain amplifier 230 and then to a power amplifier 32 such as a PA-02 amplifier. The power amplifier is configured to provide current unity voltage gain and output to drive the horizontal deflection coil 234. The usual transformer coupling between the ramp generator and the horizontal deflection coil is omitted because it is preferred to directly drive the deflection coil and because modulation of the sweep at a vertical rate is made easier (e.g. for lens correction described below). Also, impedance matching with a transformer is no longer necessary.

Figure 12:
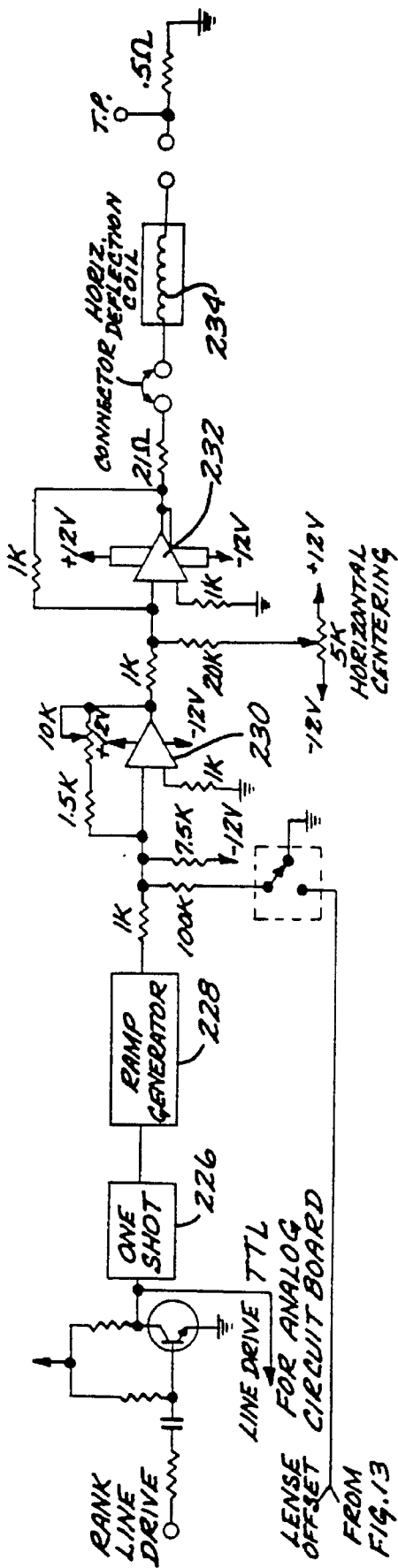
FIG. 12 is a partial schematic and electronic circuit showing the horizontal deflection circuit for the correction cathode ray tube.
Figures 17, 22A, 22B:
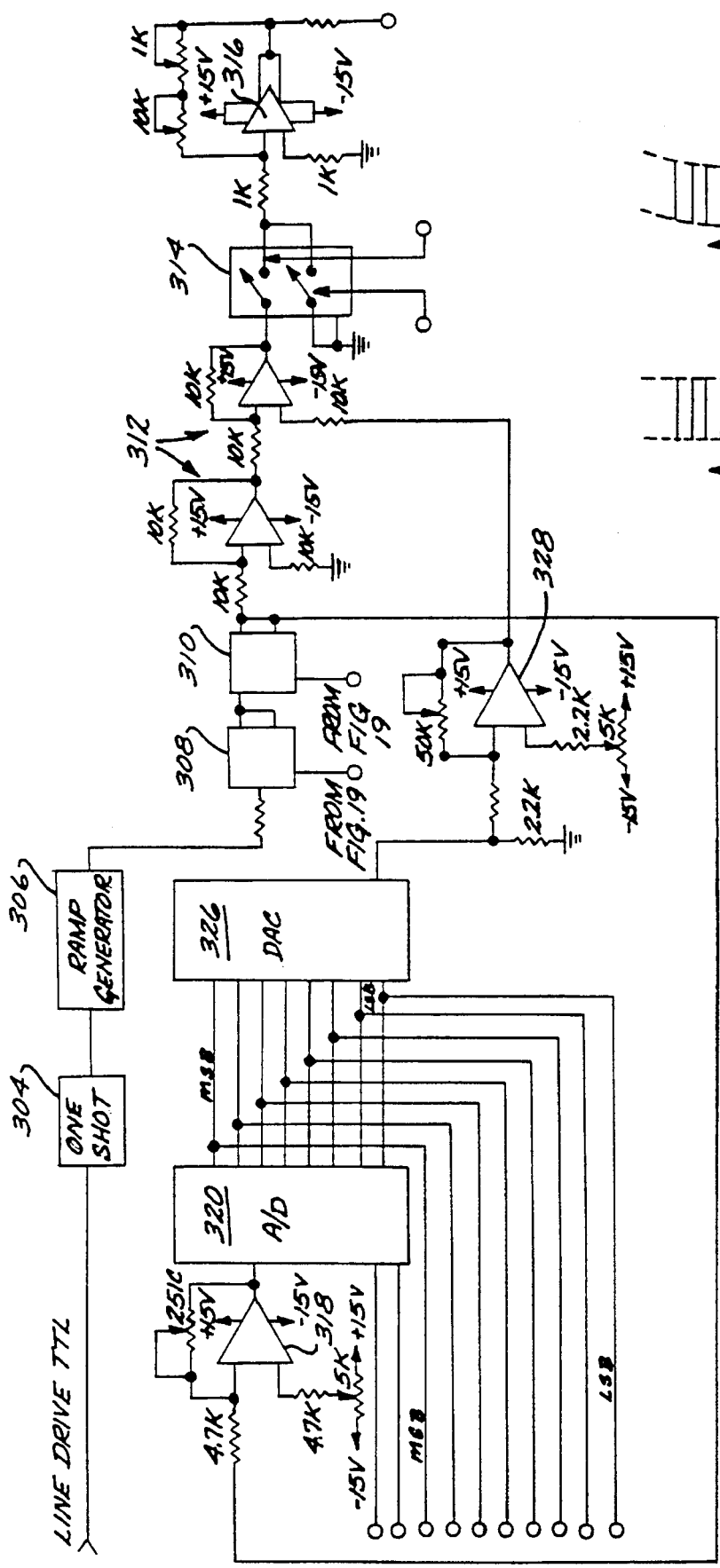
FIG. 17 is a partial schematic block diagram and electronic circuit for applying horizontal correction signals to the Rank CRT.
FIGS. 22A and 22B show partial representations of horizontal traces from the correction CRT.

FIG. 12 also shows an input from FIG. 13, discussed more fully below, for transmitting a lens correction signal to the ramp produced in ramp generator 228. The purpose for the lens correction is shown in FIGS. 22A and 22B. FIG. 22A shows an unattenuated correction CRT scan, which is desired for scanning the sprocket holes on the film. Not all of the horizontal lines are shown, and the spacing between adjacent traces is exaggerated. Because of the different amount of bending of the correction CRT beam by the different portions of the edge of the Rank lens, the uncorrected scan would appear similar to that shown in FIG. 22B. This is significant with respect to the scans of the first, second, and third sprocket holes for horizontal correction information. A gradual increase, and then decrease, in an error for the horizontal traces would produce a corresponding error in scanning of the first three sprocket holes. By not taking this error into account in such a situation, the Rank raster .would have been adjusted to correct the perceived horizontal error, resulting in a curved video output.

Correcting for the lens effect is done partly by adding an offset to each of the horizontal lines before the scanning of each of the first three sprocket holes. The amount of the offset is determined by the position of the particular line relative to the beginning of the scan of the sprocket hole. The correction signals a voltage signal which in composite form looks like a semicircle as shown in FIG. 8E. As can be seen in the lens correction corresponding to ramps 1, 2, and 3, a small offset is added to the beginning and ending groups of lines, whereas a relatively large offset is added to the intermediate lines making up the scan of the respective sprocket holes.

The semicircular voltage signal can be treated by a combination of a parabola generator and timer (not shown) which are masked during scanning of the fourth sprocket hole or through storage of digital lens correction data in the lens correction data storage device 182 on the digital circuit board. The storage device is preferably a pair of 8-bit-wide EPROMs from which the lens correction data is output to a first buffer 236 and part of a second buffer 238, shown in FIG. 13. The data are then applied to the digital-to-analog converter 240 for conversion to an analog voltage signal to be applied to a LM318 amplifier 242. The gain of the amplifier is adjusted so that the analog voltage versus time signal input to the horizontal gain amplifier 230 in the horizontal deflection circuit is semicircular in shape. The lens correction is applied on a line-by-line basis, and the actual voltage applied to the horizontal deflection circuit then depends on the horizontal trace line number about to be produced through the deflection coil.

The data stored in the lens correction memory generally follows a parabola in order to take full advantage of the plus and minus 5-volt range of the digital-to-analog converter. As discussed above, the voltage of the digital-to-analog converter has a gain applied such that the composite voltage signal of all the lines output from the digital-to-analog converter in a particular scan may form part of a circle.

In order to relate the lens correction curves to the vertical sweep ramps for the correction CRT, it is noted that the lens correction signal for the first sprocket hole contains 180 lines, corresponding to 8.55 milliseconds, followed by 39 lines of blanking for a period of 1.88 milliseconds. The second curve is similar to the first. The curve for the third sprocket hole occurs blanking and includes 155 lines over a span of 7.38 milliseconds. The fifth and sixth columns, respectively, are the high- and low-byte hexadecimal representations of the high-byte and low-byte data stored in the two 8-bit EPROMs.

The lens correction data does not correspond line for line with the data stored in the other memory devices. This is because of the way the data was obtained and digitized. This method will now be described. For any curve stored in memory, the curve can be first designed using an appropriate waveform generator, whether it be for the vertical sweep ramps, the lens correction curve, horizontal offset, shading correction, or the sample ramps.

Using an ocsilloscope, the starting and ending voltages and times for the particular curve are noted. Then along with the particular nature of the curve (ramp, semicircle, parabola), the data can be digitized by breaking the curve into discrete units, determined by the number of horizontal sweep lines which are spanned by the curve, and stored in the digital memory devices. The analog wave form generator can then be replaced by the digital memory device containing the digitized data, and a digital to analog convertor. If the digital data does not precisely reproduce the wave form desired, the digital data can be adjusted and the process repeated until such time as the desired wave form is produced. However, the quality of the original data is limited by the drift inherent in the analog wave form generator, which is passed on to the ocsilloscope when the original values are obtained. For this same reason, the starting or ending point for a given curve, such as the vertical sweep ramp for a sprocket hole, may not exactly match the respective starting or ending point on a corresponding ramp such as a voltage sample ramp. However, in the preferred embodiment, the digital data is adjusted so that the appropriate curves start at the same time and end at the same time, therefore having the same duration.

FIG. 11 also shows the other controls for the correction CRT 76. They include an EHT power supply and power supplies for the focus, G2 grid, and filament.

The vertical deflection coil of the correction CRT is controlled by a vertical sweep circuit which may include, in an analog controlled embodiment, a one-shot and ramp generator for each vertical sweep ramp to be created. However, in a preferred embodiment, the vertical sweep circuit 244 controls the vertical deflection coil of the correction CRT. The vertical sweep circuit is shown in FIG. 13 and includes half of buffer 238 and all of buffer 246 for providing digital data to a digital-to-analog converter 248 for converting the digital data- to an analog signal for controlling the vertical deflection coil. The analog signal is output to a power amplifier, such as a PA-02 amplifier, which is then coupled to the vertical deflection coil. The digital data for the vertical sweep ramps is provided to buffers 238 and 246 over a 12-bit data bus from the data storage device 188 for vertical deflection and blanking.

The second data storage device also stores data used for controlling the CRT blanking and protection circuit 250. The blanking and protection circuit controls blanking of the G1 grid and the cathode of the correction CRT.

Table I shows the relationship between the data stored in the second memory device for the vertical sweep ramps and the ramps shown in FIG. 8B. The first column indicates the time elapsed from the start of the first ramp. The time elapsed up to any given point may also be determined by counting the number of lines which have been produced and multiplying the number of lines by 47.68 microseconds, the time between adjacent line drive pulses. The second column in Table I indicates the integer representation of the data stored in a particular memory location of the second memory device. The third column represents the voltage value corresponding approximately to the integer representation in the storage device. The fourth column represents the number of lines which will be included in the time span between the corresponding entry in the table and the next succeeding entry. For example, the number of lines to be used between time zero and 8.55 milliseconds is 180. The number of lines occurring between the first 8.55 milliseconds entry, and the second 8.55 milliseconds entry is zero since the voltage drops to minus 5 volts. The first entry for 28.24 milliseconds is 3.63 volts. The number of lines at this particular voltage is zero since the time difference between the two points is zero, as indicated by the second entry for 28.24 milliseconds. The number of lines at 3.97 volts is 1 and represents a blanking pulse between the third and fourth ramps. The blanking pulse at this point is indicated in FIG. 8C.

Figure 14:
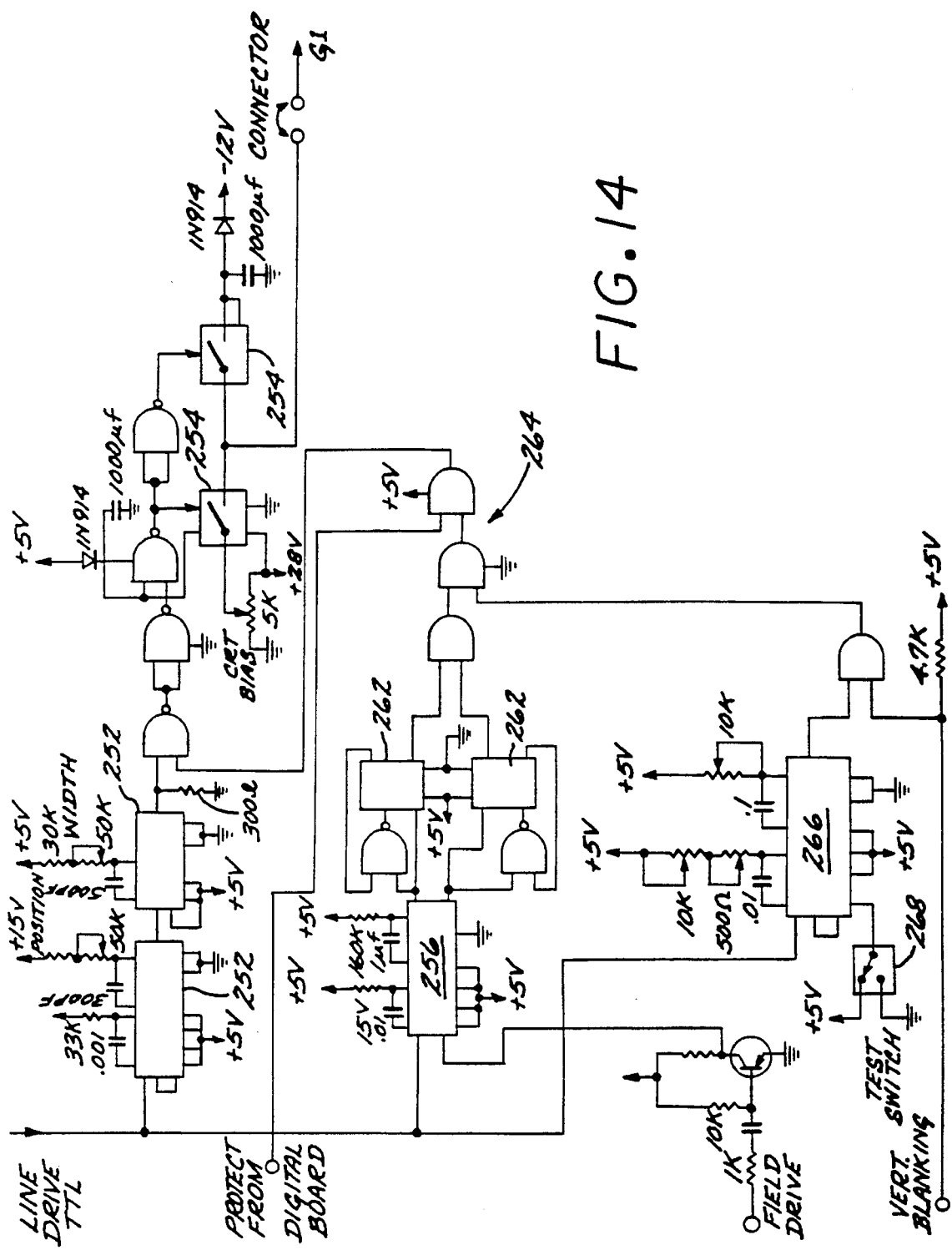
FIG. 14 shows an electrical circuit for protecting the correction cathode ray tube from loss of field drive or line drive from the Rank apparatus.

The CRT blanking and protection circuit 250 may include one-shots and timers to provide blanking signal corresponding to the timing diagram in FIG. 8C. However, in a preferred embodiment corresponding to the data stored in the second memory device, vertical blanking signals are provided to the blanking and protection circuit shown in FIG. 14 (correction CRT blanking and protection circuit 250 in FIG. 11). The vertical blanking signal passes through a series of logic gates and is applied to the G1 grid. The remainder of FIG. 14 is a protection circuit for the correction CRT to prevent damage to the correction CRT resulting from loss of line drive or field drive signals from the Rank apparatus. The line drive pulse is fed to a pair one-shots 252. The output of the second one-shot is fed to a series of NAND gates (LS00). One of the NAND gates includes a 1000-microfarad capacitor for capacitive storage to protect the correction CRT in the case of loss of power. A pair of switches 254 are placed between two of the NAND gates and the grid G1. A second 1000-microfarad capacitor is coupled for the same purpose to one side of one of the gates 254, as shown in FIG. 14. A pot is coupled to one side of the other switch 254. A retriggerable one-shot 256 receives a line drive pulse and a field drive pulse and includes two output circuits, each to a respective NAND gate and one-half of a flip-flop 262. The outputs from the flip-flops are fed to a series of AND gates 264. A nonretriggerable one-shot 266 also receives a line drive pulse and provides an output to the AND gate to which the vertical blanking signal is coupled. A switch 268 is coupled to the one-shot 266 for blanking the last half of each horizontal trace of the correction CRT. This simulates an electronic edge in the center of the correction CRT for testing the horizontal weave detection system. The one-shot is adjustable to vary the horizontal location of each trace at which blanking occurs for testing.

A protect signal is provided to the last AND 264 from the digital board (not shown). The protect signal represents and evaluation of the vertical sweep output to insure that it is at a proper level. If the vertical sweep output is too low, multiple horizontal traces at approximately the same point on the correction CRT may burn the tube face.

Figure 15:
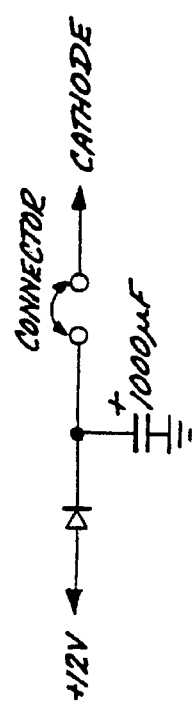
FIG. 15 shows a circuit for protecting the cathode of the correction cathode ray tube from loss of voltage.

FIG. 15 shows a protection circuit for the cathode which includes a 1000-microfarad capacitor coupled to ground between the 12-volt supply and the cathode for capacitive storage in the event of loss of voltage signal.

With the above-described circuits, the correction CRT is controlled to produce a horizontal sweep such as that shown in FIG. 9B and vertical sweeps such as those shown in FIG. 8B. Vertical blanking is provided as shown in FIG. 8C, and horizontal blanking is provided as shown in FIG. 9C. Representative portions of the correction CRT beam produced by the horizontal and vertical sweep signals are shown schematically in FIG. 7.

Figure 16:
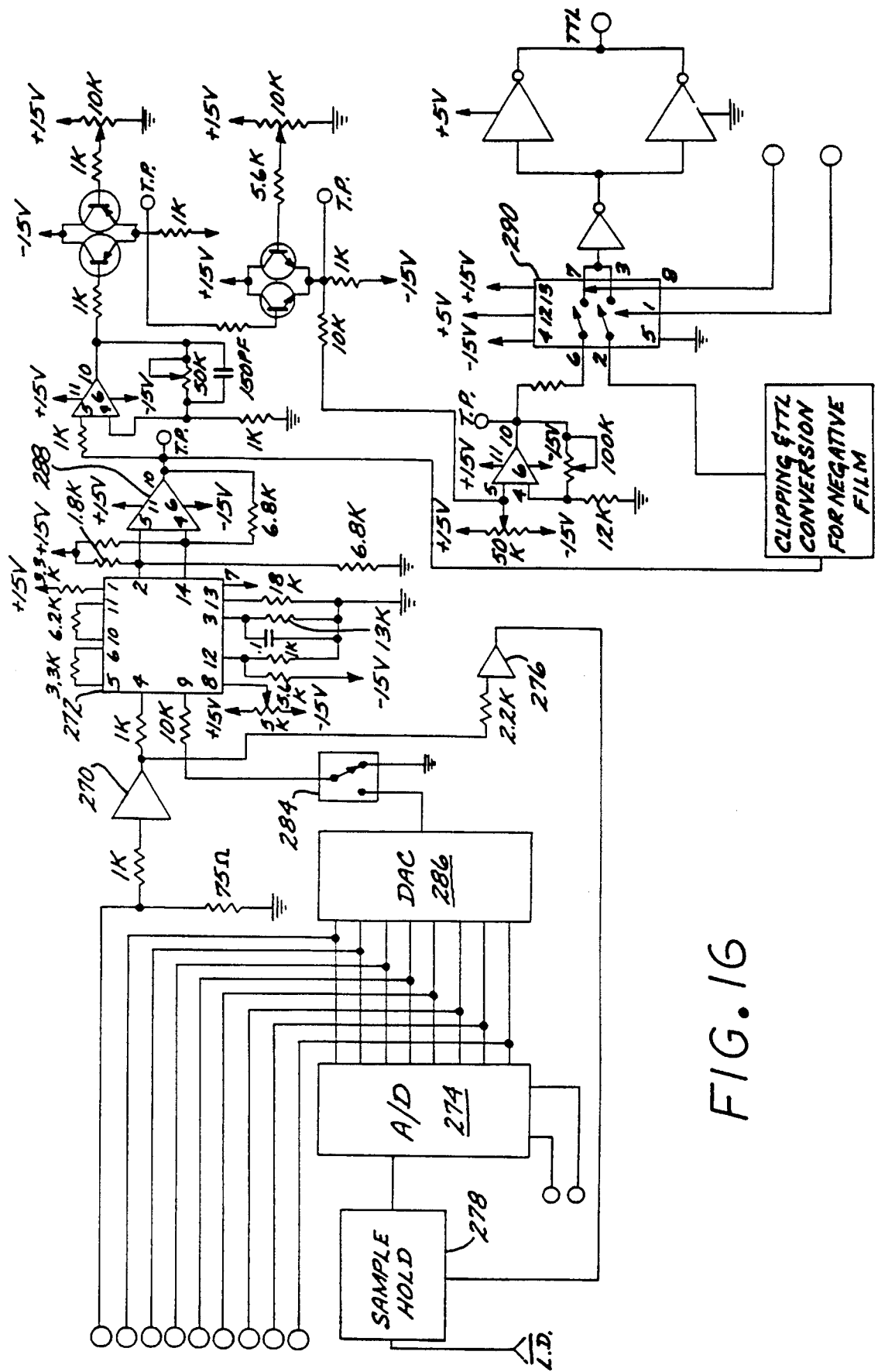
FIG. 16 shows a partial schematic block diagram and electrical circuit for processing a video signal and producing a TTL output.

The beam from the correction CRT is modulated by the edge of the film in the film gate and then transmitted to the photomultiplier tube 150. The resulting voltage signal is then amplified through an amplifier 270 (FIGS. 11 and 16). The sprocket video signal is input to a modulator 272, described more fully below, and upon actuation of an appropriate switch, input to an analog-to-digital converter 274 through an inverting amplifier 276 and a sample-and-hold 278. The sample-and-hold receives a TTL line drive pulse at pin 14 and provides a voltage output to the analog-to-digital converter. The analog-to-digital converter produces a digital output to an 8-bit bidirectional data bus for storing the digital data in the shading correction storage device 222 (FIG. 11A).

Shading correction is carried out in order to correct the sprocket hole video signals coming from the photomultiplier tube. As seen in FIG. 8D, the dashed video signal corresponding to ramps 1–3 represents an uncorrected video signal. Ideally, the video signal should be approximately a square wave, except for the existence of shading effects created by passage of the correction CRT beam through the portions of the Rank lens near the edge of the lens. Shading of the correction CRT beam results in a relatively constant reduction in signal output for those horizontal traces which pass near the edge of the Rank lens. Since the signal loss is substantially proportional to the particular location in the Rank lens through which the light passes, a larger signal loss occurs during the first and last portions of the scan of the first three sprocket holes. Relatively little loss occurs at the middle of the scan.

In order to account for the constant loss in voltage signal of the sprocket hole video, the digital data stored in the shading correction storage device 222 are used to modulate the video signal from the photomultiplier tube in modulator 272. The uncorrected curve is stored in the storage device 222 on a line-by-line basis so that the data can be used in an inverted form to modulate the video signal in the modulator 272 on a line-by-line basis. Shading correction is used on the first three sprocket hole video signals because shading affects horizontal error correction most significantly. Though storage of the uncorrected video signals includes some horizontal error in addition to the constant shading error, this is not critical because the horizontal error correctly adjusts the relative positions of the film and Rank CRT beams rather than the absolute positions. In an alternative embodiment (not shown) shading correction can be made through a parabola generator and timer similar to that used for the lens corrections. Shading correction would be masked during scanning of the fourth sprocket hole.

The uncorrected video signal is stored in the storage device 222 upon actuation of a store switch 280 (FIG. 11A) which controls shading control logic 282 comprising a flip-flop and a clock operating at field drive rate to store the uncorrected video signals for each sprocket hole. When the switch 280 is closed, the shading control logic provides start conversion signals at line rate to the analog-to-digital converter 274.

A switch 284 couples and decouples the shading control correction circuit to the modulator 272. The switch is controlled from the Rank control panel. When the switch is closed, the digital data from the shading correction storage device 222 is provided on a line drive basis over the data bus to a digital-to-analog converter 286. The modulator then produces a signal which is amplified by the video amplifier 288. The amplified signal is represented by the solid curve in FIG. 8D.

The video output is fed to a pair of circuits for clipping the video signal and creating a TTL signal to be fed to the digital board. Only one circuit is shown in detail in FIG. 16. One circuit is for clipping and converting video signals from positive film, and the other circuit for negative film. The particular circuit is selected through switch 290, controlled from the Rank control panel. The output of the clipping and conversion circuit is shown in FIG. 8F. The diagram shown in FIG. 8F corresponding to ramps 1–3 are composite diagrams of the sprocket TTL signal shown in FIG. 9E. As can be seen by comparing FIGS. 8D and 8F, clipping effectively increases the number of usable horizontal scan lines for obtaining horizontal error information. In other words, more of the horizontal scan lines at the beginning and at the end of the scan of the sprocket hole can be used. Before considering the processing of the TTL video signal, the timing and control of the digital circuit board will be considered. The Rank line and field drive signals are input to the TTL converter 292 and then passed to an address counter 294. A delay circuit (not shown) is interposed between the field drive output of the TTL convertor 292 and the field drive input of the address counter 294. The delay circuit produces an appropriate delay between receipt of the field drive pulse and resetting of the address counter 194. This delays start of the counter 294 and therefore the scan of the first sprocket hole. The delay for any given film frame rate is determined partly by the location of the correction CRT window, the spacing of the sprocket holes and the film frame rate. For a film frame rate of 24 frames per second and for the apparatus described above, the delay is approximately 5 milliseconds, as shown in FIGS. 8A and 8B. The delay will be different for different correction CRT window locations and film frame rates. The delay circuit can include a memory device for storing delay values as a function of the film frame rate.

The address counter 294 is 3 4-bit synchronous counters (a frame rate of 16 frames per second would have about 1300 lines) and is reset by the field drive signal and incremented with the line drive signal. The address counter creates the lowest eleven bits of the address while the highest order bits come from the Rank status, e.g. program stop, run, reverse, speed. The address counter provides address codes equivalent to the status of the address counter over an address bus to each of the four memory devices 182, 188, 196, and 202. Each of these memory devices then provides an output according to the data contained in the memory location corresponding to the address output from address counter 294, as is known in the art.

In an alternative embodiment (not shown), second and third address counters may be provided, along with a digital delay circuit and memory, for controlling the second and third address counters. In this configuration; the first address counter will control the first storage device 182 for outputting lens correction data, and the second memory device 188 for outputting vertical sweep data, blanking data, and ENABLE codes. Since these two storage devices are used during a majority of each frame interval, they can both be controlled by the first address counter. However, since the vertical error sample ramp stored in the third memory device 186 is used only for the fourth sprocket hole, and since the framing correction sample ramp stored in the fourth storage device 202 is used in conjunction with the fourth sprocket hole, a separate address counter or two additional separate address counters can be used to control these two memory devices. In such a configuration, storage of null values corresponding to times during scanning of the first three sprocket holes is unnecessary.

In a further alternative embodiment, where the vertical correction sample ramp data is stored in a discrete memory device separate from the memory device for the framing correction sample ramp, the second address counter controls the vertical correction sample ramp storage device. The third address counter then controls the framing correction sample ramp storage device.

The digital delay circuit would include up-down counters or several comparators for determining which address counter to start. For example, if the beginning of the framing correction scanning of the leading edge of the fourth sprocket hole begins with the 592nd line drive signal or horizontal trace, one comparator in the digital delay circuit will compare the status of the counter with the contents of the comparator, i.e., 592, and initialize and start the third address counter for controlling the fourth memory device at that time. If the framing scan lasts for 134 lines, and one line is used for blanking while the correction CRT raster is retraced to scan the leading edge of the sprocket hole, the vertical scan will start at the time corresponding to 728.

Therefore, a second comparator in the digital delay circuit will compare the output of the digital delay timer with a value of 728 in the comparator. When a match is found, the second address counter is initialized and will count with each line drive pulse. The output of the address counter is applied to the memory device containing the vertical correction sample ramp to be used in conjunction with the scan of the leading edge of the fourth sprocket hole. By using the additional address counters and a digital delay circuit, the storage space required for the vertical correction sample ramp and the framing correction sample ramp is significantly decreased. The data for each of these sample ramps are stored beginning at the first memory location, rather than beginning at the 592nd and 728th memory locations, respectively.

In the embodiment shown in FIG. 11A, the address counter is configured to count from zero to the maximum number of lines possible per frame. For a frame rate of 24 frames per second, this is slightly less than 900 lines.

The data storage device for vertical correction and blanking produces ENABLE signals during appropriate intervals during scanning of the sprocket holes. During scanning of the first, second, and third sprocket holes, a horizontal correction ENABLE signal is produced from the second data storage device 188 to the horizontal error filter and pulse generator 212. During the first 134 lines of the scan of the fourth sprocket hole, a framing control ENABLE signal is produced to the framing control signal detector 206. During the last 137 lines of the scan of the fourth sprocket hole, a vertical correction ENABLE signal is produced for the vertical error signal detector 200. The horizontal correction ENABLE signal is shown in FIG. 8G, the framing ENABLE signal is shown in FIG. 8K, and the vertical correction ENABLE signal is shown in FIG. 8M. As can be seen in the ENABLE signal of FIG. 8G, the horizontal correction circuit is enabled for a time less than that corresponding to the full scan of each of the sprocket holes. In other words, the beginning and ending lines of the scans of each sprocket hole are ignored. In the preferred embodiment, the number of usable lines is maximized, and the number of ignored lines is minimized. In the scan of the third sprocket hole, the first several of the lines of the scan are ignored. These peripheral lines are ignored in order to eliminate the possibility of erroneous correction signals being supplied to the correction coil of the Rank CRT resulting from high noise signals during these parts of the scans.

Referring now to FIG. 19, a horizontal digital filter is shown for distinguishing between transient voltage drops in the voltage signal sensed from the correction CRT beam and valid voltage drops due to edge-crossings. Where many horizontal traces are used to scan a sprocket hole, the likelihood of a dust particle or other artifact interfering with the correction CRT beam is significant. For example, where a horizontal trace crosses a dust particle, the intensity of the signal from the film plane abruptly decreases. In some instances, this could be detected as an edge-crossing, thereby triggering the horizontal error correction circuit 210. Because there is ordinarily only one edge-crossing for each horizontal trace during scanning of the first three sprocket holes, a filter can be designed for ignoring those horizontal traces during scanning of a sprocket hole where more than one "edge-crossing" is detected. The horizontal digital filter of FIG. 19 carries out this function. A line drive signal is applied to a one-shot 296, and the sprocket hole TTL is applied to a flip-flop 298. The one-shot resets the flip-flop 298 and sets a second flip-flop 300. When the sprocket hole TTL produces a negative-going pulse, the first flip-flop is toggled. If the sprocket hole TTL signal produces a second negative-going pulse before a second lined drive pulse occurs at one-shot 296, the second flip-flop is reset. Whenever the second flip-flop is reset, the output from the series of NAND gates is disabled, indicating more than one edge-crossing within the span of one horizontal trace.

The horizontal digital filter also includes a pair of one-shots 302 for enabling a first sample-and-hold in the horizontal error and offset correction circuit 210.

The horizontal error and offset correction circuit 210 is shown in FIG. 17. A one-shot 304 receives a line drive pulse and produces a pulse to a ramp generator 306 for producing a bipolar horizontal error sample ramp. The sample ramp is input to the first sample-and-hold. The first sample-and-hold is enabled by a pulse from the second in the pair of one-shots 302 (FIG. 19) when a negative-going TTL pulse is received from the sprocket hole TTL. When the first sample-and-hold is enabled, the voltage from the ramp generator 306 is sampled and held and output to a second sample-and-hold 310. If the second sample-and-hold is enabled by the digital filter shown in FIG. 19, the second sample-and-hold will take the voltage from the first sample-and-hold and output the voltage signal to a pair of inverting amplifiers 312 through a switch 314 to a PA-02 amplifier 316. The output of the power amplifier is applied to the horizontal correction coil of the horizontal and vertical error correction coil 134. The switch 314 is coupled to the Rank control panel for enabling or disabling the horizontal correction.

The output of the second sample-and-hold 310 is also provided to an amplifier 318 and input to an analog-to-digital converter 320 for conversion to digital data for storage in the horizontal offset correction data storage device 208. The output of the analog-to-digital converter 320 is provided to the storage device 208 over an 8-bit bidirectional data bus. When store switch 324 is closed, the offset control logic 322 (FIG. 11A) provides start conversion signals at line drive rate to the analog-to-digital converter 240. The 8-bit bidirectional data bus is also coupled to the input of a digital-to-analog converter 326 for converting the digital data to a voltage signal to be output through an inverting amplifier 328. The analog-to-digital converter 320, the bidirectional data bus, the horizontal error correction offset, the data storage device 208, the control logic 322, and the store switch 324 have a structure and function similar to the corresponding elements used in the shading correction circuit and shading control logic. The offset memory stores the analog signal shown in FIG. 8H in digital form. The horizontal error signal includes a relatively constant offset, which is believed to be due to residual lens effects not accounted for with the shading correction and the lens correction previously carried out. The horizontal error signal is stored in the offset memory 208 for the duration of the field drive but only the data stored for the first three sprocket holes is used for horizontal error correction. The data in the offset memory 208 are applied to the digital-to-analog converter 326 and applied inverted relative to the original voltage signal to the horizontal correction voltage signal output from the second sample-and-hold 310 in order to correct for the offsat. Therefore, after each line drive pulse, the negative-going sprocket TTL voltage signal causes the horizontal pulse-generator 212 to produce an enabling signal for the first sample-and-hold 308. The first sample-and-hold samples the voltage versus time ramp from the ramp generator (see FIG. 9F) and holds the voltage at the instant of the ENABLE signal. If no further negative-going TTL pulses are received before the next line drive pulse, the second sample-and-hold samples the output from the first sample-and-hold and applies the voltage sampled to the first of the pair of amplifiers 312. A voltage is applied to the second of the pair of amplifiers, along with a horizontal error voltage signal from the offset memory 208. The horizontal error offset voltage has a value corresponding to data in the memory location corresponding to the particular horizontal trace producing the sprocket TTL. This process is repeated for each horizontal trace for sprocket holes 1–3. FIG. 8I shows a representative voltage versus time curve representing the output of the horizontal error correction circuit. The output voltage can be positive or negative. The output voltage will vary while the horizontal correction enable signal is low but, while the enable signal is high (between the first pair of arrows and between the second pair of arrows and after the last arrow in the second pair and the first arrow in the first pair), will maintain the voltage output corresponding to the last horizontal scan until the next horizontal scan is made.

In the case where more than one negative-going pulse is received in the horizontal logic filter, the second sample-and-hold is not enabled, and the voltage from the previous line drive is maintained. As soon as only one negative-going pulse is received by the horizontal logic filter between line drive pulses, the second sample-and-hold will again sample the voltage output from the first sample-and-hold.

The third storage device 196 for storing the vertical error correction sample ramp data and the fourth storage device for storing the framing error correction sample ramp may be combined into one storage device. This could be done, for example, where only one address clock is used to control the digital circuit board. The single storage device is two 8-bit EPROMs.

With a single memory device storing the vertical error sample ramp and the framing error sample ramp, a single digital-to-analog converter can be used for converting the digital data to an analog voltage for input to a vertical error correction circuit or a framing error correction circuit, according to the setting of a logic switch. The logic switch would switch from the framing correction circuit to the vertical correction circuit at the end of the framing error correction scan of the leading edge of the fourth sprocket hole. At the end of the scan of the leading edge of the fourth sprocket hole, the switch returns to its original configuration.

Figure 18:
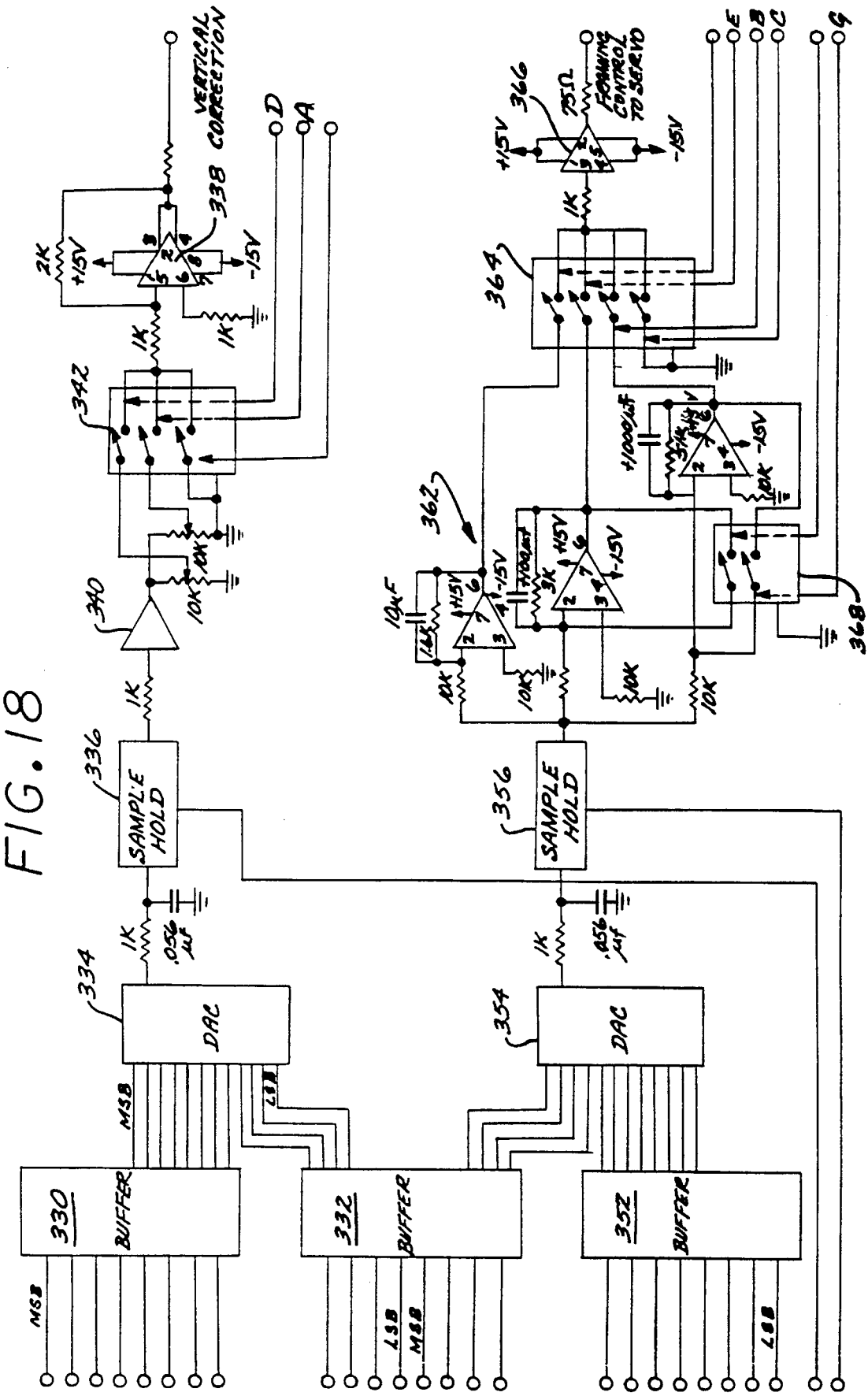
FIG. 18 is a partial schematic diagram and electronic circuit for providing vertical correction signals to the Rank CRT and framing signals to the Rank servo.

In a preferred embodiment, the third and fourth memory devices are separate pairs of EPROMs, the third memory device containing the data for the vertical error correction sample ramp (FIG. 8L), and the fourth memory device containing the data for the framing error correction sample ramp (FIG. 8J). The third storage device includes a pair of 8-bit EPROMs and provides data over a 12-bit data bus to first and second buffers 330 and 332, respectively, on the analog circuit board (FIG. 18). The eight bits from the first buffer 330 and the first four bits from the second buffer 332 are provided to a digital-to-analog converter 334 for conversion to an analog voltage signal to be input to the vertical correction circuit. The voltage output from the digital-to-analog converter 334 is provided to a sample-and-hold 336. The output of the sample-and-hold is provided to a power amplifier 338 (such as a PA-02 amplifier) through a buffer 340 and a switching circuit 342. The power amplifier drives the vertical correction coil in the horizontal and vertical error correction coil 134. (The vertical and framing sample ramps can also be produced through appropriate ramp generators, as would be known to one skilled in the art.)

The sample-and-hold 336 is enabled through a vertical error sample pulse from the vertical error signal detector 200 on the digital circuit board. The vertical error signal detector is shown in FIG. 20 and includes a retriggerable one-shot 344 to which is applied the sprocket hole TTL and the vertical correction ENABLE signal. The one-shot 344 triggers a nonretriggerable one-shot 346 to enable the sample-and-hold 336 in the vertical error correction circuit.

The switch 342 is coupled to the vertical and framing correction timing circuit 348 in the digital circuit board (FIG. 11A). The switching control circuit is shown in FIG. 23 and includes inputs from the Rank control panel corresponding to run forward and frame off. The switching control circuit includes a one-shot 350 and a series of NAND gates for indicating the status of the Rank apparatus. Several signals from the switching control circuit of FIG. 0 are applied to the switch 342 in the vertical correction circuit. When the film is started from the stop position, the Rank CRT raster must be quickly adjusted to follow the frames to obtain the picture information. This requires quickly moving the raster to scan a frame which has already moved upward, followed by moving the raster slowly to its original position when the Rank CRT raster has "caught up" with the film. The switch 342 includes two pots for providing adjustable vertical control of the Rank CRT raster during the time immediately after the film is started according to the setting of the switch.

The data storage device 202 for storing the framing sample ramp data is coupled through a 12-bit data bus to the second buffer 332 and a third buffer 352 and then to a digital-to-analog converter 354. The digital-to-analog converter 354 converts the digital data from the fourth storage device to a voltage signal for input to a sample-and-hold 356. Over the duration of the scan of the leading edge of the fourth sprocket hole, the output of the digital-to-analog converter will be similar to the framing sample ramp in FIG. 8J. The sample-and-hold 356 is enabled by a framing control sample signal from the framing control signal detector 206. The framing control signal detector is shown in FIG. 21 and is similar to the vertical control signal detector of FIG. 20. A framing correction ENABLE signal from the second storage device 188 is input to the retriggerable one-shot 358 which triggers the nonretriggerable one-shot 360.

The output of the sample-and-hold 356 is provided to a series of op-amps 362 for providing variable framing correction during startup. The output of the op-amps are coupled to a switch 364, which outputs the voltage signal through buffer 366 to the Rank servo. The series of op-amps includes a switch 368 for grounding the capacitors on the second and third op-amps when the Rank film drive is turned off. The switch 368 includes input lines from the vertical and framing switching control 348.

In a preferred embodiment, the framing control signal is applied to the Rank servo through a 20-turn trimmer pot for adjusting the servo as a function of the framing error correction signals. Preferably, the framing error correction signals are applied to the Rank servo in such a manner as to continue applying the framing correction signal until such time as the framing error is eliminated. Then, the servo can be locked until such time as framing error begins to occur again.

The switch 364 is used to adjust the framing during start of the film drive. The switch serves a function similar to the switch 342 in the vertical correction circuit. The framing switch includes leads from the vertical and framing switching control 348 discussed above. In an alternative embodiment, the vertical and framing switching control may be comprised of one-shots for timing of the switches.

Though the apparatus has been described with respect to a film frame rate of 24 frames per second, it is contemplated that similar data can be stored in the digital circuit board corresponding to any one of a number of film frame rates. Different portions of each of the memory locations would be used to store data for the respective ramps and correction curves. For example, the vertical deflection memory would contain vertical sweep ramps for the correction CRT for each frame rate to be used with the Rank apparatus. An appropriate delay following the field drive pulse can be provided for the first vertical sweep ramp in each set corresponding to each frame rate. It is contemplated that a 6-bit speed bus can be used to obtain speed data from the Rank apparatus. This data, along with stop, run, reverse and other Rank status information, would be input to the digital circuit board through the buffer 370 to a high-order address decoder 372. The high-order address decoder would provide a high-order address (bits higher than the eleventh from the address counter) for accessing the additional locations in the memory devices for outputting the appropriate data, depending upon the speed and other Rank status information supplied. The data to be stored in the memory devices would be derived in a manner similar to that described above. The Rank speed information would also be provided to the shading control logic, the offset control logic, and the vertical and framing switching control. At speeds other than 24 and 30 film frames per second, the digiscan could be controlled to clock out the video fields in a sequence other than 2–3 and 2—2, respectively. The appropriate sequencing for each speed can be determined. The apparatus can accomodate both the NTSC and PAL video formats.

It should be noted that the above-described apparatus can be used for horizontal and vertical error correction when the film is run in reverse. All that need be done is to make appropriate modifications in the polarities of the various signals, as would be known to one skilled in the art in view of the description herein.

The above-described apparatus can also be used for compositing multiple film elements together. For example, two or more sets of information recorded on separate film according to the film format of 24 frames per second would be difficult to transfer to video having a format of 30 frames per second, on an interlaced basis, and still have each of the two fields in each frame for the two or more sets of information align, as would be required. The present apparatus can be used to match the 2–3 video field sequencing for the two or more sets of information.

It is also contemplated that a light shield is applied to the end of the correction CRT extending from the end of the correction CRT toward the 45° mirror.

When the apparatus is assembled and adjusted as necessary, and the data loaded in the EPROMs, the apparatus is turned on to run film through the film gate. The film is run through the film gate, and the horizontal, vertical, and framing correction systems turned on. The Rank status information will be input to the digital circuit board and line drive and field drive pulses provided to the digital and analog circuit boards. For 35 mm film, at a frame rate of 24 frames per second, the first, second, and third sprocket holes are scanned for horizontal error correction. Framing and vertical correction occur with respect to scanning of the fourth sprocket hole. The operator then uses the appropriate controls on the Rank control panel to initially frame the picture information in both the horizontal and vertical directions by adjusting the Rank CRT. This effectively sets the zero point with respect to which horizontal, vertical, and framing error detection occurs. Because the horizontal error correction system maintains the crests of the first, second, and third sprocket holes at the center of the correction CRT prior to the operator adjusting the framing, any framing adjustments in a horizontal direction subsequently carried out by the operator from the control panel moves the Rank CRT beam horizontally without changing the horizontal location of the film. This effectively defines the horizontal reference point since the correction CRT is centered on the crest of the sprocket hole, and the ramps are bipolar. The same comments apply with respect to vertical framing adjustment carried out by the operator at the control panel.

The operator also actuates the store switches 280 and 324 (FIG. 11A) to store digital data corresponding to appropriate shading curves and horizontal offset curves while the film is running.

An existing Rank cintele apparatus can be modified using the following components:
1. 35 mm skid plate having a correction CRT window;
2. 35 mm condensing lens assembly having a prism and an opening for the fiber optic cable;
3. 16 mm skid plate similarly modified;
4. 16 mm condensing lens assembly similarly modified;
5. modified bezel with correction CRT mount and mirror block assembly;
6. photomultiplier tubes;
7. photomultiplier tube chassis and connectors including a light-tight box;
8. fiber optic cable;
9. modified Rank cell box cover;
10. fiber optic tip locking assembly;
11. correction CRT (one inch);
12. correction coil (yoke) for Rank cathode ray tube;
13. modified Rank tube carriage spacers;
14. power supply chassis;
15. correction CRT processor chassis;
16. trap door for the first Rank 45° mirror;
17. cables and harnesses; and
18. test film.

The processor will have been previously programmed with appropriate data for the different frame rates to be used with the Rank apparatus.

With the above described apparatus, focussed beam scanning of the actual reference points by which the film frames are registered on the film provides precise registration of the film during viewing or transfer of the film. This can be done on a real time basis, for example, at 24 frames per second, 25 frames per second and 30 frames per second. Both horizontal and vertical weave correction is achieved using a scanner separate from that used for scanning the picture information on the film. Framing error is also corrected. Multiple scans can be made to provide high accuracy and resolution in the weave correction. An extra coil is used on the scanner for the picture information to provide rapid adjustment of the film scanner.

FIGS. 24A–24N show a revised set of curves similar to those shown in FIGS. 8A–8M representing signals produced during operation of the apparatus. The characteristics of the signals represented by the curves different from those shown in FIGS. 8A–8M will be apparent from the following discussion. The general purpose in controlling the apparatus as represented by these curves will also be apparent.

Considering FIG. 24B, after a framing correction signal is applied to the telecine servo mechanism, the same sprocket hole No. 4 is scanned as before for vertical correction. The vertical sweep ramps 4 and 5 for the framing and vertical correction are shown in FIG. 24B. Following the vertical correction and before the scanning of the top of the picture frame is begun, horizontal correction scanning is begun for sprocket hole No. 1, the vertical sweep ramp for which is shown as ramp 1 in FIG. 24B. As the crest of the sprocket hole passes outside the window (scanning area for the correction CRT), the scanning beam for the correction CRT is caused to retrace slightly down to the approaching trailing horizontal edge of the sprocket hole. During the retrace, the correction CRT is blanked, as indicated as in FIG. 24C. Before the scanning beam of the correction CRT reaches a point where the beam would intersect the horizontal or the trailing edge of the sprocket hole, the retrace is terminated and an additional, shorter ramp is applied to the correction CRT between ramps 1 and 2. The slope of the intermediate ramp is less than the slope of ramp 1 so that the vertical advance of the scanning beam is slower than that for the edge of the sprocket hole, and therefore the film speed. At a given point during the scan, one of the horizontal traces will intersect the trailing edge of the sprocket hole and produce a signal indicating the relative vertical location of the trailing edge of the sprocket hole. Vertical correction is then accomplished as required in a manner similar to that previously described with respect to vertical correction.

During retrace to the beginning of ramp 2, the correction CRT is blanked as indicated in FIG. 24C. Horizontal correction is then carried out in conjunction with sprocket hole number 2 as before. Further vertical correction is then carried out with respect to the trailing edge of sprocket hole number 2 between ramps 2 and 3. The curves represented in FIGS. 24D and 24F do not include signal portions corresponding to the additional vertical correction ramps, but such signals would be apparent to one skilled in the art. FIG. 24H shows the modified error signal (first sample) developed as a result of the additional vertical correction. FIG. 24L represents the vertical sample ramps which are symmetrical. FIG. 24N shows representations of the vertical correction enable signal applied while scanning the trailing edges of the first and second sprocket holes.

Vertical correction is carried out more than once per frame because it was found that film registration in the vertical direction is substantially improved, especially during scanning of the middle and trailing portions of the film frame. Because the time available to accomplish vertical registration in conjunction with the first and second sprocket holes is substantially less than with the fourth sprocket hole, fewer horizontal traces occur during the vertical correction with the first and second sprocket holes. The time during which the vertical correction is accomplished for the first and second sprocket holes is the time after which the crest of the immediately preceding sprocket hole has left the correction CRT window and the time just before the crest of the next succeeding sprocket hole enters the correction CRT scanning window.

Vertical and horizontal registration can be accomplished even while the film is stopped and a film frame is located over the aperture in the gate. Registration of the film relative to the Rank scanning beam is necessary for various film transfer procedures where repeatability is significant. Registration is desired because the film frame is not always precisely centered over the film gate when the film is stopped in order for the film scanner to start scanning at the correct place in the film frame.

In order to provide vertical and horizontal registration in the stop mode, the number of scan lines between field drive pulses is maximized in order to get the best resolution, in other words, in order to obtain the maximum number of horizontal scan lines per linear distance on the correction CRT. Then, at a predetermined point after field drive, horizontal sweeps are created which move incrementally according to the vertical sweep voltage from above the sprocket hole toward the top edge of the sprocket hole being viewed on the film gate while the film is stationary. If the film is registered and correctly centered over the film gate, the horizontal trace will cross the top edge of the sprocket hole during a specific horizontal trace, i.e., after a determinant number of line drive pulses. When the horizontal trace passes into the sprocket hole area, a signal is produced to indicate the relative location of the top horizontal edge of the sprocket hole and therefore indicating whether or not the film frame is vertically registered relative to the Rank scanning CRT.

Horizontal registration is determined by counting a predetermined number of scan lines or line drive pulses after the scan crosses the top of the sprocket hole. The number of pulses necessary to reach the exact center of the sprocket hole from the top edge can be determined since sprocket holes on registered film have predetermined dimensions within known tolerances. When the scanned video signal goes high as the horizontal trace crosses the top edge of the sprocket hole, a TTL signal is created which initializes a counter to count until the center of the sprocket hole is reached at a predetermined time. At the time when the correction CRT scanning beam is at the vertical center of the sprocket hole, a single horizontal scan is initiated so that the scan crosses the crest of the sprocket hole. Horizontal registration is then accomplished as previously described. Vertical and horizontal registration can be accomplished at each frame drive pulse.

It has been found that vertical correction signals can be most beneficially applied to the vertical deflection amplifier of the telecine apparatus. This is especially useful during run-up correction, i.e., the correction necessary to register the film frame information even while the telecine film drive is approaching the normal operating speed. It has been found to be beneficial to provide film registration during run-ups because the ordinary servo system for the telecine frames the film in the film gate relatively slowly. Because the film has not yet reached operating speed and because the electromechanical servo system has a relatively large overshoot for error, the correction provided by the correction CRT and the corresponding correction circuitry does not require the resolution during scanning of the upper or lower edge of the sprocket hole which is found to be important during vertical correction while the film is moving at the standard speed. Therefore, the relative difference in the vertical speed of the film and of the correction CRT beam does not need to be as small. As the telecine servo system is framing the film during run-up, it is beneficial to register the film eventhough the film has not yet been properly framed. Therefore, the framing ramp, ramp 4 of FIG. 24B, applies a vertical sweep voltage, starting at a point about 500 milliseconds after the "run forward" signal is received. Thereafter, the correction CRT scans a horizontal edge of the sprocket hole and determines the extent to which framing has not been accomplished at that point. A correction signal is then applied to the vertical deflection amplifiers to move the Rank CRT beam to follow the film frame. Preferably, the top edge of the sprocket is scanned to develop the error correction signal.

Run-up correction is made for a predetermined time while the electromechanical framing is still occurring. In response to the "run forward" signal a run-up vertical correction enable signal is produced, as shown in FIG. 24N, which corresponds to ramp 4 of the vertical sweep ramps in FIG. 24B. A vertical sample ramp, shown in FIG. 24L provides a voltage sample ramp for use in applying a correction signal to the vertical deflection amplifiers of the telecine CRT. The ramp shown in FIG. 24L is symmetric but is shown for purposes of clarity as having a slope which is less than what it would ordinarily be. A vertical correction enable signal is also produced to enable the run-up correction, though the enable signal is not shown in FIG. 24M. As soon as the servo mechanism frames the film, the run-up vertical correction will be disabled at a predetermined time thereafter.

Preferably, the vertical sample ramps are stored in memory. The vertical sample ramp for run-up vertical correction is accessed only when the run-up vertical correction enable signal is produced.

Using the run-up vertical correction, the telecine raster can follow the film frame eventhough the film has not been properly framed. In other words, the film frame is not yet centered over the usual location in the film gate where the telecine is ordinarily set to scan the film frame. The vertical run-up correction system causes the Rank scanning beam to follow the film frame and therefore maintain it in registration therewith, until the film frame moves over the center of the film gate to be scanned by the telecine scanning beam at the usual location.

A further embodiment of a process for shading correction operates to change the light output of the correction CRT when the correction scanning beam is at the outer portion of the lens which produces the shading error. Rather than electronically applying a correction signal to the output developed through the lens, an appropriate boosting signal is applied to the control grid G1 of the correction CRT during those times when the scanning beam of the correction CRT is influenced by shading. By modulating the signal at the control grid, the output of the correction CRT is increased when the vertical sweep is deflected beyond a predetermined point at which shading originally starts to occur.

Figure 25:
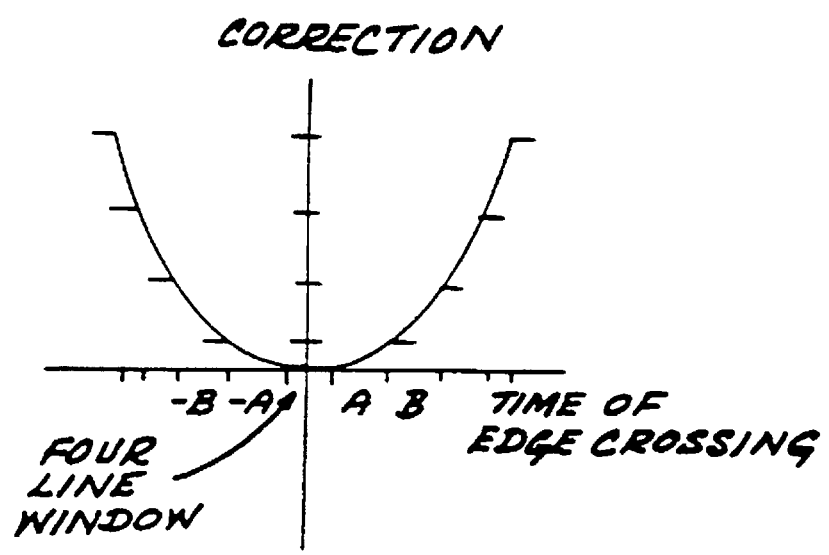
FIG. 25 depicts an acceleration curve for providing an appropriate signal to the framing servo.

A further embodiment for a framing correction circuit will now be described and which would eliminate the framing sample ramp, FIG. 8J. The scanning of the edge of the sprocket hole for framing correction is carried out in the manner previously described. However, the information derived from the location of the sprocket hole is processed in a different manner. Specifically, software is used to define a framing window, approximately four line drive pulses wide, wherein no framing correction is carried out if the scanning beam from the correction CRT crosses the edge of the sprocket hole during the time defined by the window. Generally, if the scanning beam from the correction CRT crosses the edge of the sprocket hole earlier than the occurrence of the window, a signal will be applied to the framing servo to adjust the framing as appropriate. Similarly, if the scanning beam crosses the sprocket hole edge after the window, an appropriate correction is also applied. The correction is applied according to an acceleration curve, wherein a new voltage, of the appropriate sign and magnitude, is applied to the framing servo. The greater the time difference between the edge crossing and the window, the greater is the magnitude of the correction signal applied to the framing servo to reframe the film. FIG. 25 depicts the acceleration curve stored as representative of values in memory to be accessed by an appropriate input signal for providing an appropriate signal to the framing servo. The depiction in FIG. 25 represents an idealized representation of the data to be stored in memory. In practice, it is sufficient to have four discrete values stored in memory corresponding to four different magnitudes of correction signal on each side of the window to be output from memory to the framing servo. For example, if the film is adequately framed, the time of the edge crossing of the scanning beam from the correction CRT will fall within the four line window depicted in FIG. 25. However, if the edge crossing occurs at time "A" after the four line window, i.e., the edge crossing occurred within a first interval after the time calculated for proper framing, a first correction signal will be applied to the framing servo based on the value output from the memory. However, if the edge crossing occurs in the time interval "B", a suitably higher correction signal will be applied to the servo to return the framing to its proper position.

It should be understood that the four line window is merely a precalculated time after field drive when the scanning beam from the correction CRT should cross the leading edge of sprocket hole number 4. The four line window could occur at any appropriate point between field drive pulses.

Considering the framing correction system in more detail, an appropriate enable signal, such as field drive or another pulse created a predetermined time after field drive, is applied to a clock, which could be incremented with the line drive signal, in order to count toward and past the four line window. The clock may produce an appropriate output to access memory locations according to the state of the clock when an edge crossing occurs. If an edge crossing occurs outside the four line window, an output will be provided from the memory through appropriate circuitry to a digital-to-analog converter and amplifier to provide a correction of appropriate sense and magnitude to the framing servo.

It should be noted that the above are preferred configurations, but others are foreseeable. The described embodiments of the invention are only considered to be preferred and illustrative of the invented concepts. The scope of the invention is not to be restricted to such embodiments. Various and numerous other arrangements may be devised by one skilled in the art without departing from the spirit and scope of the invention. For example, the concepts can be applied to a projection system for registering the film. This could not only eliminate weave but could also eliminate the need for intermittent pull down.

TABLE I

| Time (MSEC) | Integer Representation | Volts | #Lines |
|---|---|---|---|
| 0 | 0 | −5 | 180 |
| 8.55 | 4072 | 5 | 0 |
| 8.5 | 0 | −5 | 39 |
| 10.43 | 0 | −5 | 180 |
| 18.98 | 4072 | 5 | 0 |
| 18.98 | 0 | −5 | 39 |
| 20.86 | 0 | −5 | 155 |
| 28.24 | 3511 | 3.63 | 0 |
| 28.24 | 422 | −3.97 | 1 |
| 28.34 | 422 | −3.9 | 134 |
| 34.7 | 1544 | −1.21 | 0 |
| 34.7 | 659 | −3.39 | 137 |
| 41.21 | 350 | 3.57 | 0 |

We claim:

1. A method of detecting the position of a sprocket hole in a film recording or reproducing apparatus which employs a continuous motion film drive, comprising:

causing a beam of radiation and the film to move relative to one another in a vertical direction to determine the position of a horizontal edge of the sprocket hole; and causing the beam of radiation to illuminate a substantially vertical edge of a sprocket hole to determine the position of the vertical edge at a specified location relative to the film in response to the determination of the position of the horizontal edge.

2. A method of detecting the position of a sprocket hole according to claim 1, wherein the beam of radiation is caused to cross the vertical edge of the sprocket hole by sweeping the scanning beam in continuous horizontal motion across the film while the film moves vertically.

3. A method of detecting position in a film recording or reproducing apparatus which employs a continuous motion film drive, comprising:

causing a beam of radiation and the film to move relative to one another in a vertical direction so as to illuminate a substantially horizontal edge of a sprocket hole;

detecting the substantially horizontal edge in order to determine its position in the vertical direction;

causing the beam of radiation and the film to illuminate a substantially vertical edge of a sprocket hole; and determining the horizontal position of the substantially vertical edge at a location along the vertical edge which is selected in response to the determination of the vertical position of the horizontal sprocket hole edge.

4. A method of determining the position of picture information on film by detecting the position of at least one sprocket hole of the film in a film recording or reproducing apparatus which employs a continuous motion film drive, comprising:

causing a beam of radiation and the film to move relative to one another in a vertical direction so as to illuminate a substantially horizontal edge of a sprocket hole;

detecting the substantially horizontal sprocket hole edge in order to determine its position in the vertical direction;

causing the beam of radiation and the film to illuminate a substantially vertical edge of a sprocket hole; and detecting the horizontal position of the substantially vertical sprocket hole edge at a selected location along the substantially vertical sprocket hole edge, the selected location being chosen in response to the determination of the vertical position, and determining from it the position of the picture information.

5. A method according to claim 4, wherein:

detecting the substantially horizontal edge includes detecting the substantially horizontal sprocket hole edge of a first sprocket hole in order to determine its position in the vertical direction; and detecting the horizontal position includes detecting the horizontal position of the substantially vertical sprocket hole edge of a second sprocket hole, different from the first.

6. A method according to claim 4, wherein the film has sprocket holes of generally fixed dimensions, and wherein:

causing the beam of radiation and the film to illuminate a substantially vertical edge of a sprocket hole at a selected location along the substantially vertical sprocket hole edge includes causing the beam of radiation and the film to experience relative horizontal movement at a vertical position that is calculated to be at a vertical midpoint of the substantially vertical sprocket hole edge; and detecting the horizontal position includes detecting the horizontal position of the vertical midpoint.

7. A method according to claim 4, wherein the picture information bears a known, fixed distance with respect to the position of the substantially vertical sprocket hole edge, and further wherein:

causing a beam of radiation and the film to move relative to one another in a vertical direction so as to illuminate a substantially horizontal edge of a sprocket hole includes adjusting the speed of the continuous motion film drive to thereby adjust the relative vertical position between the beam of radiation and the substantially vertical sprocket hole edge; and imaging the film at a location selected in response to the position of the substantially vertical sprocket hole edge, whereby an estimated position of the picture information is imaged in response to the position of the substantially vertical sprocket hole edge.

8. A method according to claim 4, wherein causing the beam of radiation and the film to move relative to one another in a vertical direction includes sweeping the beam in predominantly horizontal motion across the film while the film moves vertically relative to the beam.

9. An apparatus that detects the position of a sprocket hole in a film recording or reproducing apparatus which employs a continuous motion film drive, comprising:

a vertical deflection generator that controls a radiation beam to move relative to the film in a vertical direction to determine the position of a horizontal edge of the sprocket hole; and a horizontal deflection generator that causes the beam to move relative to the film in a horizontal direction to detect the position of a vertical edge of the sprocket hole based on the position of the horizontal edge.

10. An apparatus according to claim 9, wherein the horizontal deflection generator includes a horizontal line sweep generator that sweeps the beam horizontally across the film while the film moves vertically.

11. An apparatus that detects the position of a sprocket hole of film in a film recording or reproducing apparatus which employs a continuous motion film drive, comprising:

a radiation source that illuminates the film with a beam of radiation;

a vertical deflection generator operatively coupled to said radiation source to control vertical movement of said beam of radiation relative to movement of the film, said vertical deflection generator controlling said beam of radiation to move relative to the film such that said beam of radiation vertically crosses a sprocket hole edge;

a detector that detects a transition of said beam of radiation across said sprocket hole edge, said deflector operatively coupled to said vertical deflection generator; and a horizontal deflection generator operatively coupled to said radiation source to control horizontal movement of said beam of radiation relative to the film, wherein said vertical deflection generator is responsive to detection of said transition of said beam of radiation as it vertically crosses said sprocket hole edge to, in cooperation with said horizontal deflection generator, control said beam of radiation to horizontally cross said sprocket hole edge.

12. An apparatus according to claim 11, wherein the source of radiation is positioned on one side of the film, and the detector is position on the other side of the film.

* * * * *